US010972406B2

(12) United States Patent
Zhang et al.

(10) Patent No.: US 10,972,406 B2
(45) Date of Patent: Apr. 6, 2021

(54) INDICATING WHETHER A USER DEVICE CAN ACCESS A COMPUTING RESOURCE BASED ON WHETHER A CURRENT TIME FALLS WITHIN ONE OR MORE TIME SLOTS ASSOCIATED WITH THE COMPUTING RESOURCE

(71) Applicant: Citrix Systems, Inc., Fort Lauderdale, FL (US)

(72) Inventors: Xiao Zhang, Nanjing (CN); Zongpeng Qiao, Nanjing (CN); Jie Zhuang, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/580,044

(22) Filed: Sep. 24, 2019

(65) Prior Publication Data
US 2021/0058339 A1 Feb. 25, 2021

Related U.S. Application Data

(63) Continuation of application No. PCT/CN2019/102126, filed on Aug. 23, 2019.

(51) Int. Cl.
*G06F 15/173* (2006.01)
*H04L 12/911* (2013.01)
*H04L 29/08* (2006.01)
*H04L 12/66* (2006.01)

(52) U.S. Cl.
CPC ............ *H04L 47/826* (2013.01); *H04L 67/10* (2013.01); *H04L 67/32* (2013.01); *H04L 12/66* (2013.01)

(58) Field of Classification Search
CPC ....... H04L 67/10; H04L 67/32; H04L 47/826; H04L 12/66
USPC .................................................. 709/225-226
See application file for complete search history.

(56) References Cited

U.S. PATENT DOCUMENTS

| 6,661,806 | B1* | 12/2003 | Eriksson ............... H04L 47/826 370/310.2 |
| 7,606,899 | B2* | 10/2009 | Martin .................... H04L 67/34 709/225 |
| 8,972,577 | B2* | 3/2015 | Bauchot .............. H04W 56/002 709/226 |
| 10,013,730 | B2* | 7/2018 | Wu ......................... G06F 16/44 |
| 2010/0122290 | A1* | 5/2010 | Allen ..................... H04N 21/47 725/38 |

(Continued)

FOREIGN PATENT DOCUMENTS

CN 103927475 A 7/2014

OTHER PUBLICATIONS

International Search Report and Written Opinion dated May 27, 2020 in International Application No. PCT/CN2019/102126.

*Primary Examiner* — Bharat Barot
(74) *Attorney, Agent, or Firm* — Pierce Atwood LLP

(57) ABSTRACT

Disclosed are methods, systems and computer-readable media involving data that associates a computing resource with at least one time slot. Based at least in part on the data and a current time being within the at least one time slot, a device may be caused to display an indication that the computing resource can be accessed using the device. Based at least in part on the data and a current time being outside the at least one time slot, the device may be caused to cease displaying the indication.

20 Claims, 17 Drawing Sheets

(56) References Cited

U.S. PATENT DOCUMENTS

2012/0046984 A1* 2/2012 Benayon .......... G06Q 10/06311
                                                705/7.13
2013/0047229 A1   2/2013 Hoefel et al.
2016/0012251 A1*  1/2016 Singh ................. H04L 63/102
                                                707/783
2016/0310648 A1  10/2016 Pernot

* cited by examiner

| Computing Resource | User | Time Slot Data |
|---|---|---|
| Resource A | First User | First Time Slot(s) |
| Resource B | Second User | Second Time Slot(s) |
| ⋮ | ⋮ | ⋮ |
| Resource A | Second User | Third Time Slot(s) |

Resource Visibility Table — 108

| Computing Resource | User | Time Slot Data |
|---|---|---|
| Resource A | First User | Fourth Time Slot(s) |
| Resource B | Second User | Fifth Time Slot(s) |
| ⋮ | ⋮ | ⋮ |
| Resource A | Second User | Sixth Time Slot(s) |

Resource Accessibility Table — 602

| User | Client Device |
|---|---|
| First User | First Device |
| Second User | Second Device |

Device Access Table — 110

FIG. 6

INDICATING WHETHER A USER DEVICE CAN ACCESS A COMPUTING RESOURCE BASED ON WHETHER A CURRENT TIME FALLS WITHIN ONE OR MORE TIME SLOTS ASSOCIATED WITH THE COMPUTING RESOURCE

CROSS-REFERENCE TO RELATED APPLICATIONS

This application is a continuation of and claims the benefit under 35 U.S.C. § 120 and 35 U.S.C. § 365(c) to International Application PCT/CN2019/102126, entitled TIME-BASED RESOURCE MANAGEMENT, with an international filing date of Aug. 23, 2019, the entire contents of which are incorporated herein by reference for all purposes.

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a computer-implemented method involves determining first data associating a first computing resource with at least one first time slot, determining that a current time is within the at least one first time slot, causing a first device to display a first indication that the first computing resource can be accessed using the first device based at least in part on the first data and the current time being within the at least one first time slot, determining that the current time is outside the at least one time slot, and causing the first device to cease displaying the first indication based at least in part on the first data and the current time being outside the at least one time slot.

In some of the disclosed embodiments, a computing system includes at least one processor and at least one computer-readable medium. The at least one computer-readable is encoded with instructions which, when executed by the at least one processor, cause the computing system to determine first data associating a first computing resource with at least one first time slot, to determine that a current time is within the at least one first time slot, to cause a first device to display a first indication that the first computing resource can be accessed using the first device based at least in part on the first data and the current time being within the at least one first time slot, to determine that the current time is outside the at least one time slot, and to cause the first device to cease displaying the first indication based at least in part on the first data and the current time being outside the at least one time slot.

In some of the disclosed embodiments, at least one computer-readable medium is encoded with instructions which, when executed by at least one processor, cause the at least one processor to determine first data associating a first computing resource with at least one first time slot, to determine that a current time is within the at least one first time slot, to cause a first device to display a first indication that the first computing resource can be accessed using the first device based at least in part on the first data and the current time being within the at least one first time slot, to determine that the current time is outside the at least one time slot, and to cause the first device to cease displaying the first indication based at least in part on the first data and the current time being outside the at least one time slot.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 6 shows examples of tables that may be maintained by a database of the resource management system shown in FIG. 5;

DETAILED DESCRIPTION

Figure 1:
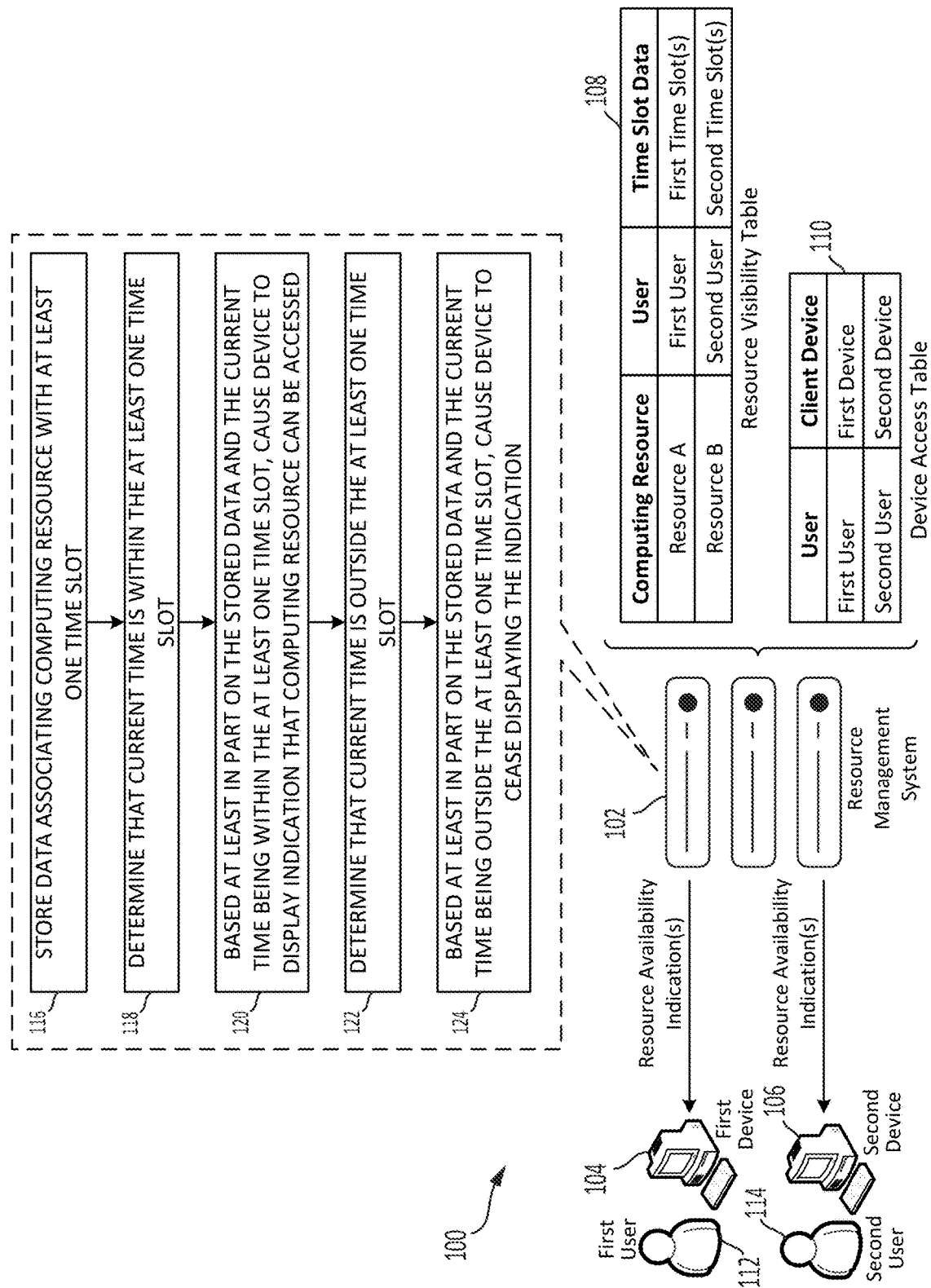
FIG. 1 is a diagram illustrating an example system for managing the visibility and/or accessibility of resources to users and/or devices based on time slots.

For purposes of reading the description of the various embodiments below, the following descriptions of the sections of the specification and their respective contents may be helpful:

Section A provides an introduction to example embodiments of time-based resource management systems disclosed herein;

Section B describes a network environment and computing environment which may be useful for practicing embodiments described herein;

Section C describes embodiments of systems and methods for delivering shared resources using a cloud computing environment;

Section D describes embodiments of systems and methods for managing and streamlining access by clients to a variety of resources;

Section E provides a detailed description of example embodiments of time-based resource management system disclosed herein; and Section F describes example implementations of methods, systems, and computer-readable media in accordance with the present disclosure.

A. Introduction to Illustrative Embodiments of a Time-Based Resource Management System The inventors have recognized and appreciated that, as more and more computing resources (e.g., applications, desktops, files, etc.) become available for users of client devices, it can sometimes be difficult to locate a specific resource for use at a given time. Typically, resource management systems provide users with only three options for identifying a resource to be accessed. A first option is to present the user with a list of "all" of the available resources of a particular type that the user is permitted to access. For instance, in response to a user selecting an option to view "all apps," the user can be presented with a list of all applications to which the user has access privileges. A second option is to present the user with a list of the user's "favorite" resources of a particular type, which may include only the resources of the particular type (e.g., applications, desktops, files, etc.) that are accessed the most frequently by the user. Finally, a third option is to allow the user to search for a resource using the resource's name. While useful in some circumstances, these existing options can have drawbacks. For example, when a user wants to access a particular resource that is not on a "favorite" list, the user may have difficulty identifying the desired resource within an extensive list of "all" available resources of the type in question. Scanning such an extensive list for the desired resource can be time consuming. The "searching" option can also be time consuming, especially if the user is not certain of the precise name of the resource in question.

The inventors have also recognized and appreciated that circumstances can exist in which particular users might not need to be able to access one or more resources during certain time windows. For instance, a user who works only three days per week, might not need to be able access one or more resources during the remaining two days of the workweek, or a user who works only a "swing" shift (i.e., 4:00 p.m.-midnight) might not need to be able access one or more resources during the "day" shift (i.e., 8:00 a.m.-4:00 p.m.) or the "graveyard" shift (i.e., midnight-8:00 a.m.). In other cases, a user may need to access an application or other resource only at one or more specific times, e.g., to allow the user to perform a specific work-related task.

Offered is a system in which resources can be associated with one or more time slots that are used to manage the accessibility and/or visibility of the resources to a particular user and/or a specific client device. In some embodiments, for example, a given user and/or a given client device may be permitted to access one or more particular resources only during specific, assigned time slots. Such embodiments may be useful, for example, when a resource is to be shared by two or more users, with the respective users being given the ability to access to the shared resource during different time slots. Such resource sharing may, for example, involve the sharing of an exclusive "lock" on a common instance of a resource (e.g., a file to be edited), or may involve the provision of respective instances of a resource (e.g., a remotely delivered application) to different users and/or client devices. In some embodiments, for example, an enterprise may be charged (e.g., per day, per hour, per minute, etc.) for only the specific time slot(s) during which a resource is made accessible to given users and/or client devices.

In some implementations, a user of a client device may select an option to view "currently accessible" resources of a particular type, e.g., "currently accessible apps," which may be presented either in addition to or in lieu of options for viewing "all" or "favorite" resources of the type in question. When a user makes such a selection, the user interface of the client device may identify only those resources that are associated with time slot data indicating that such resources are to be "accessible" to the requesting user and/or client device at the time the selection is made. In other implementations, a user interface identifying currently accessible resources may instead be presented in response to a user selecting an option to view "all" resources of a particular type, e.g., "all apps." In still other implementations, when a user selects an option to view "all" resources of a particular type, e.g., "all apps," all resources of the particular type that are accessible by that user and/or client device, whether or not such resources have been scheduled to be accessible by that user and/or client device at the current time, may be listed, and those listed resources that are currently accessible may be indicated, e.g., by highlighting them, and/or those listed resources that are not currently accessible may be indicated, e.g., by graying them out. In some implementations, the currently accessible resources may additionally or alternatively be presented at the beginning of such a list for easy access.

In other embodiments, a given user and/or a given client device may, at least in response to certain user interface selections, additionally or alternatively be presented with an indication of the availability of one or more particular resources only during specific, assigned time slots. A user may, for example, be presented with an option of viewing "scheduled" resources of a particular type, e.g., "scheduled apps," either in addition to or in lieu of options for viewing "all," "favorite," and/or "currently accessible" resources of the type in question. For instance, in response to a user of a client device selecting an option to view "scheduled apps," the client device may present a user interface that identifies only those applications that are associated with time slot data indicating that such applications are to be "visible" to the requesting user and/or client device at the time the selection is made. In some implementations, the system may additionally permit the user to separately select an "all" resources option to view all resources of a given type, e.g., "all apps," that are accessible by that user and/or client device, whether or not such resources have been scheduled to be visible to that user and/or client device, in case the user wishes to access a resource that has not been "scheduled" for the time in question. Alternatively, in other implementations, resources that have been scheduled to be "visible" may be identified within a list of "all" resources of a particular type that are currently accessible to that user and/or client device, e.g., by highlighting or labeling them as scheduled, and may additionally or alternatively be presented at the beginning of such a list for easy access. In still other implementations, scheduled "visible" resources may be included within a "favorites" list and also be identified within such a list, e.g., by highlighting or labeling them as scheduled, and may additionally or alternatively be presented at the beginning of such a list for easy access.

FIG. 1 illustrates an example configuration of a system 100 that may be used to implement various aspects of the present disclosure. As shown, the system 100 may include a resource management system 102, a first device 104, and a second device 106. Although the illustrated example shows the resource management system 102 as including just three servers, it should be appreciated that the system 102 may include any number of servers (including only a single server) as well as any number of additional or different components, such as one or more databases, other network components, etc. Although not illustrated in FIG. 1, it should be appreciated that the resource management system 102, the first device 104, and the second device 106 may be interconnected via a wide area network (such as the Internet), one or more local area networks, and/or one or more other network types, as described in more detail below. In some embodiments, in addition to the functionality described herein relating to resource management, the resource management system 102 may perform other services for the first device 104 and the second device 106. In some embodiments, for example, the resource management system 102 may provide a virtual workspace environment to the first device 104 and the second device 106, as well as many more devices associated with a business or other enterprise. The Citrix Workspace™ and Citrix Virtual Apps and Desktops™, by Citrix Systems, Inc., of Fort Lauderdale, Fla., are examples of computing systems capable of providing such an environment.

As shown in FIG. 1, the resource management system 102 may maintain one or more tables for managing the visibility and/or accessibility of computing resources based on time slot data. Examples of entries in a resource visibility table 108, as well as entries in a device access table 110, are shown in the illustrated embodiment. The entries in the device access table 110 may, for example, indicate which users are currently operating which client devices. In the example shown, those entries indicate that a first user 112 is operating the first device 104, and that a second user 114 is operating the second device 106. As shown, entries in the resource visibility table 108 may associate each computing resource, e.g., a desktop, an application, a file, etc., with one or more users as well as one or more time slots. In the illustrated example, the entries in the resource visibility table 108 associate "resource A" with the first user 112 and "first time slot(s)" and further associate "resource B" with the second user 114 and "second time slot(s)." "Resource A" and "resource B" may, for example, correspond to respective applications and the "first time slot(s)" and the "second time slot(s)" may, for example, each correspond to one or more time slots within a calendar. The indicated time slots may, for example, correspond to a single occasion, e.g., 9:00 a.m.-11:00 a.m. on a specific date, multiple individual occasions, e.g., 8:00 a.m.-1:00 a.m. on two specific days, or one or more recurring time periods, e.g., every Monday, Wednesday and Friday, from 1:00 p.m.-5:00 p.m.

As illustrated in FIG. 1, the resource management system 102 may provide indications to the first device 104 and the second device 106 concerning the availability of various resources managed by the system 102, which indications may be based at least in part on the data in the resource visibility table 108 and the device access table 110. In particular, the resource availability indication(s) provided to the first device 104 and the second device 106 may depend on whether the current time is within a time slot indicated by the time slot data included in the resource visibility table 108. In some embodiments, the resource availability indication(s) may further be based on the identity of the user who is currently operating the client device in question, as reflected by the entries in the device access table 110. In other embodiments, the resource visibility table 108 may instead directly correlate computing resources with one or more time slots and one or more specific client devices. Because, in such embodiments, the resource availability indication(s) need not depend on user identities, the device access table 110 need not be employed in such implementations. In either case, a determination may be made, based on the time slot data associated with managed resources, whether indications are to be sent to either or both of the first device 104 and the second device 106 that a particular resource is available at a given time.

Although not illustrated in FIG. 1, in some embodiments, the resource management system 102 may additionally or alternatively maintain an "accessibility resource table" which includes similar entries, but which are used to determine whether managed resources are to be "accessible" to individual users and/or client devices, as described in more detail below. An example of a resource accessibility table 602 is described below in connection with FIG. 6. Examples of processes for setting/modifying the time slot data in the resource visibility table 108, as well as the resource accessibility table (shown in FIG. 6), are described below in connection with FIGS. 7-12.

FIG. 1 further shows example steps that may be performed by the resource management system 102 in accordance with some embodiments of the present disclosure. As shown, at a step 116, the resource management system 102 may store data associating a computing resource with one or more time slots. Such data may, for example, correspond to the entries in the resource visibility table 108 that correlate "computing resources" with "time slot data." At a step 118, a determination may be made as to whether the current time is within the indicated time slot(s). For example, if the current time is 2:00 p.m. on a specific day, and the time slot data identifies 1:00 p.m.-3:00 p.m. on that same day as an applicable time slot, then the current time would be within an indicated time slot.

At a step 120, the resource management system 102 may cause a client device, e.g., the first device 104 or the second device 106, to display an indication that a computing resource corresponding to the satisfied time slot is accessible. Such an indication may, for example, correspond to the inclusion of the computing resource on a list of available resources that is displayed by the client device. As shown, the indication may be based on the current time being within the indicated time slot as well as the data stored in the resource visibility table 108. The identity of the client device that displays the indication may be determined based either on the identity of the user operating the client device or on the identity of the client device itself, independent of the identity of the user operating that device. For example, with reference to the tables 108, 110 shown in FIG. 1, the entry in the device access table 110 indicating that the first user 112 is operating the first device 104, together with the entry in the resource visibility table 108 indicating that the "resource A" is associated with the first user 112 and the "first time slot(s)," may suffice to determine that a resource availability indication is to be provided to the first device 104 when the current time is within one of the "first time slot(s)." In other embodiments, rather than correlating the "resource A" with the first user 104 and the "first time slot(s)," the entries in the resource visibility table 108 may instead directly correlate the "resource A" with the first device 104 and the "first time slot(s)," such that an indication of the availability of the "resource A" may be presented by the first device 104 when the current time is within one of the "first time slot(s)," regardless of the identity of the person operating the first device 104.

At a step 122, a determination may be made as to whether the current time is outside the indicated time slot(s). For example, if the current time is 5:00 p.m. on a specific day, and the time slot data identifies 1:00 p.m.-3:00 p.m. on that same day as an applicable time slot, then the current time would be outside that time slot.

At a step 124, the resource management system 102 may cause a client device to cease displaying an indication that a computing resource is accessible. As shown, the determination to cease displaying the indication may be based on the current time being outside the specified time slot(s) for the resource as well as the stored data, e.g., the entries in the tables 108, 110. An act of ceasing to display the indication may, for example, correspond to the removal of the computing resource from a list of available resources that is displayed by the client device.

Additional details and example implementations of embodiments of the present disclosure are set forth below in Section E, following a description of example systems and network environments in which such embodiments may be deployed.

B. Network and Computing Environment

Figure 2A:
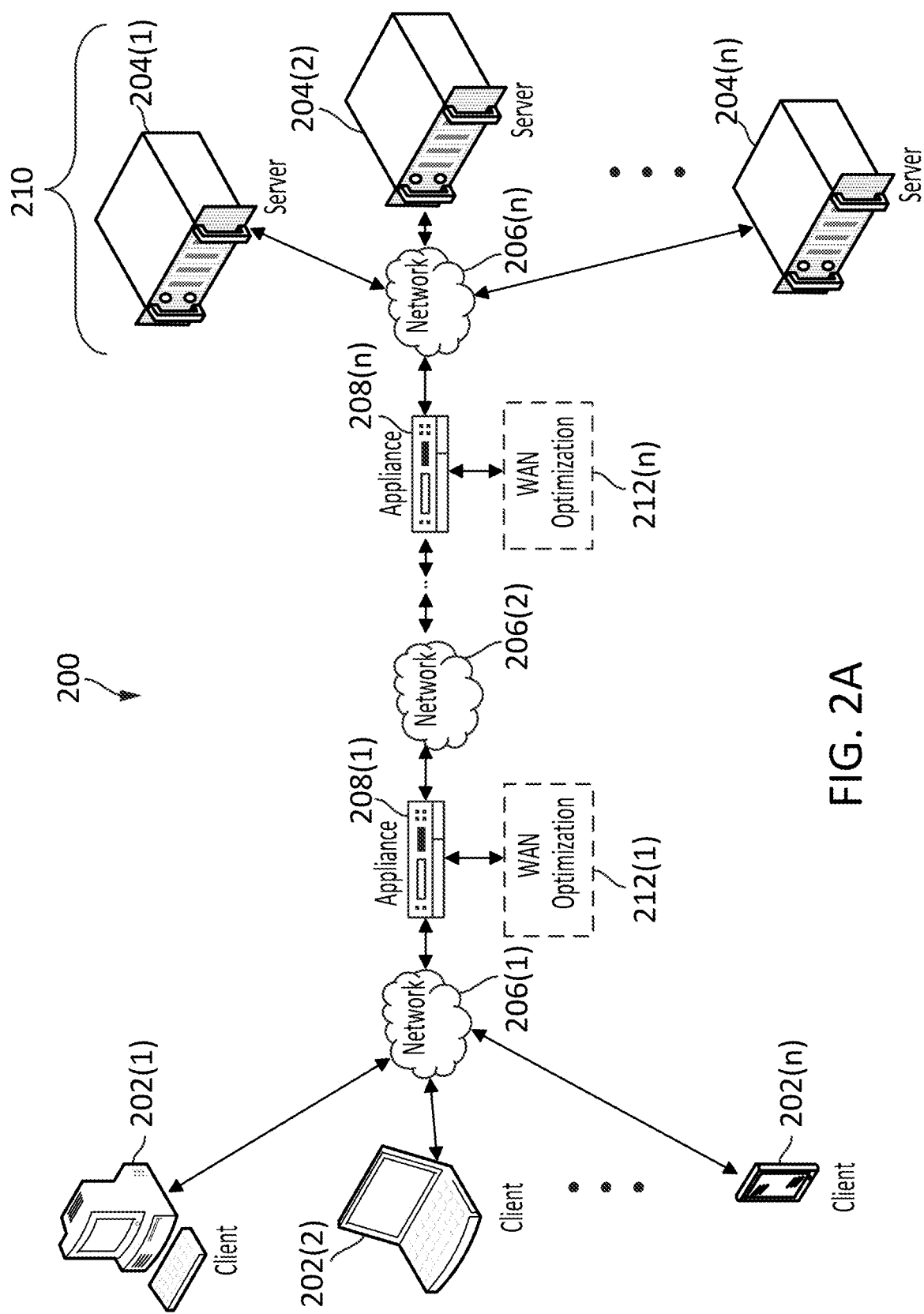
FIG. 2A is a diagram of a network computing environment in which some embodiments of the time-based resource management system disclosed herein may be deployed.

Referring to FIG. 2A, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2A shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may each be a private network such as a local area network (LAN) or a company Intranet, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 204 may include one or more wireless local-area networks (WLANs). For short range communications within a WLAN, clients 202 may communicate using 802.11, Bluetooth, and/or Near Field Communication (NFC).

As shown in FIG. 2A, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, each appliance 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 102.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2A, in some embodiments, groups of the servers 204 may operate as one or more server farms 210. The servers 204 of each such server farm 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2A, in some embodiments, one or more of the appliances 208 may include, be replaced by, or be in communication with, one or more additional appliances, such as WAN optimization appliances 212(1)-212(n), referred to generally as WAN optimization appliance(s) 212. For example, each WAN optimization appliance 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller. In some embodiments, for example, one or more of the appliances 212 may be implemented as products sold by Citrix Systems, Inc., of Fort Lauderdale, Fla., such as Citrix SD-WAN™ or Citrix Cloud™.

Figure 2B:
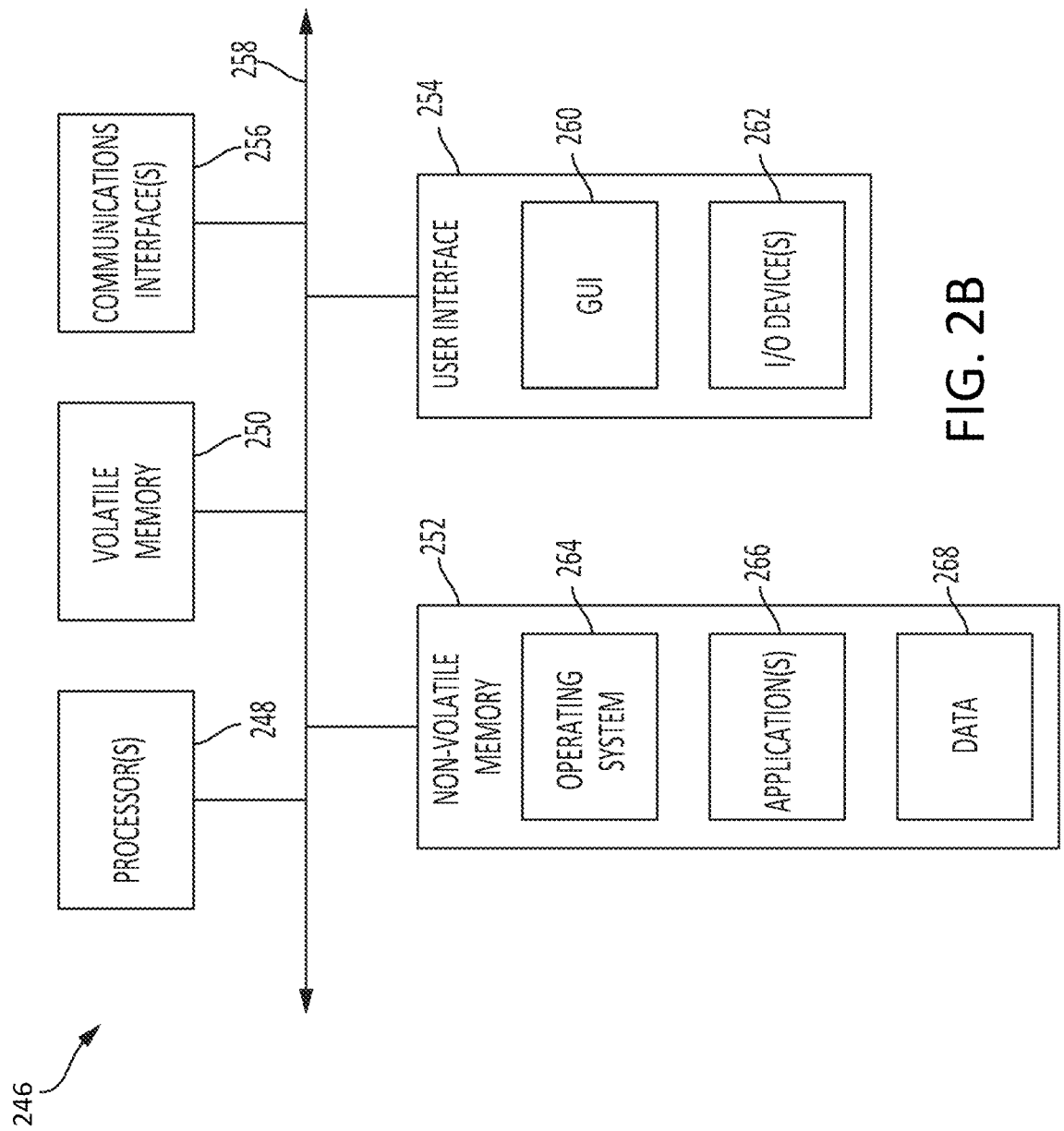
FIG. 2B is a block diagram of a computing system that may be used to implement one or more of the components of the computing environment shown in FIG. 2A in accordance with some embodiments.

FIG. 2B illustrates an example of a computing system 246 that may be used to implement one or more of the respective components (e.g., the clients 202, the servers 204, the appliances 208, 212) within the network environment 200 shown in FIG. 2A. As shown in FIG. 2B, the computing system 246 may include one or more processors 248, volatile memory 250 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, etc.) and one or more input/output (I/O) devices 262 (e.g., a mouse, a keyboard, etc.). The non-volatile memory 252 may store an operating system 264, one or more applications 266, and data 268 such that, for example, computer instructions of the operating system 264 and/or applications 266 are executed by the processor(s) 248 out of the volatile memory 250. Data may be entered using an input device of the GUI 260 or received from I/O device(s) 262. Various elements of the computing system 246 may communicate via communication the bus 258. The computing system 246 as shown in FIG. 2B is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 256 may include one or more interfaces to enable the computing system 246 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 246 may execute an application on behalf of a user of a client computing device (e.g., a client 202), may execute a virtual machine, which provides an execution session within which applications execute on behalf of a user or a client computing device (e.g., a client 202), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 3:
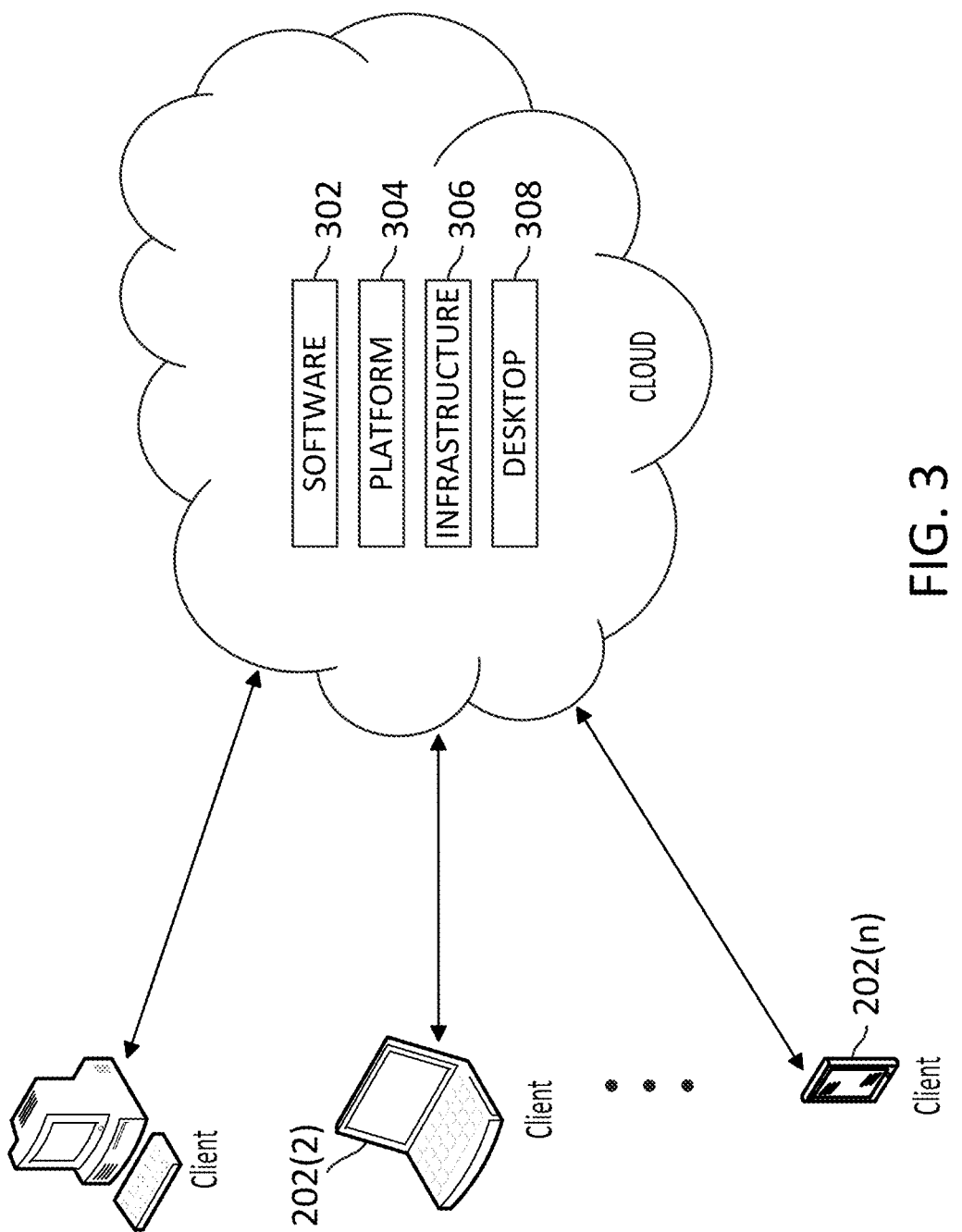
FIG. 3 is a schematic block diagram of a cloud computing environment in which various aspects of the time-based resource management system disclosed herein may be implemented.

C. Systems and Methods for Delivering Shared Resources Using a Cloud Computing Environment Referring to FIG. 3, a cloud computing environment 300 is depicted, which may also be referred to as a cloud environment, cloud computing or cloud network. The cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 300, one or more clients 202 (such as those described above) are in communication with a cloud network 304. The cloud network 304 may include back-end platforms, e.g., servers, storage, server farms and/or data centers. The clients 202 may correspond to a single organization/tenant or multiple organizations/tenants. More particularly, in one example implementation, the cloud computing environment 300 may provide a private cloud serving a single organization (e.g., enterprise cloud). In another example, the cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 300 may provide a hybrid cloud that is a combination of a public cloud and a private cloud. Public clouds may include public servers that are maintained by third parties to the clients 202 or the enterprise/tenant. The servers may be located off-site in remote geographical locations or otherwise.

The cloud computing environment 300 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 300 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 300 can provide an elasticity to dynamically scale out or scale in response to different demands from one or more clients 202. In some embodiments, the cloud computing environment 300 may include or provide monitoring services to monitor, control and/or generate reports corresponding to the provided shared services and resources.

In some embodiments, the cloud computing environment 300 may provide cloud-based delivery of different types of cloud computing services, such as Software as a service (SaaS) 302, Platform as a Service (PaaS) 304, Infrastructure as a Service (IaaS) 306, and Desktop as a Service (DaaS) 308, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

Figure 4A:
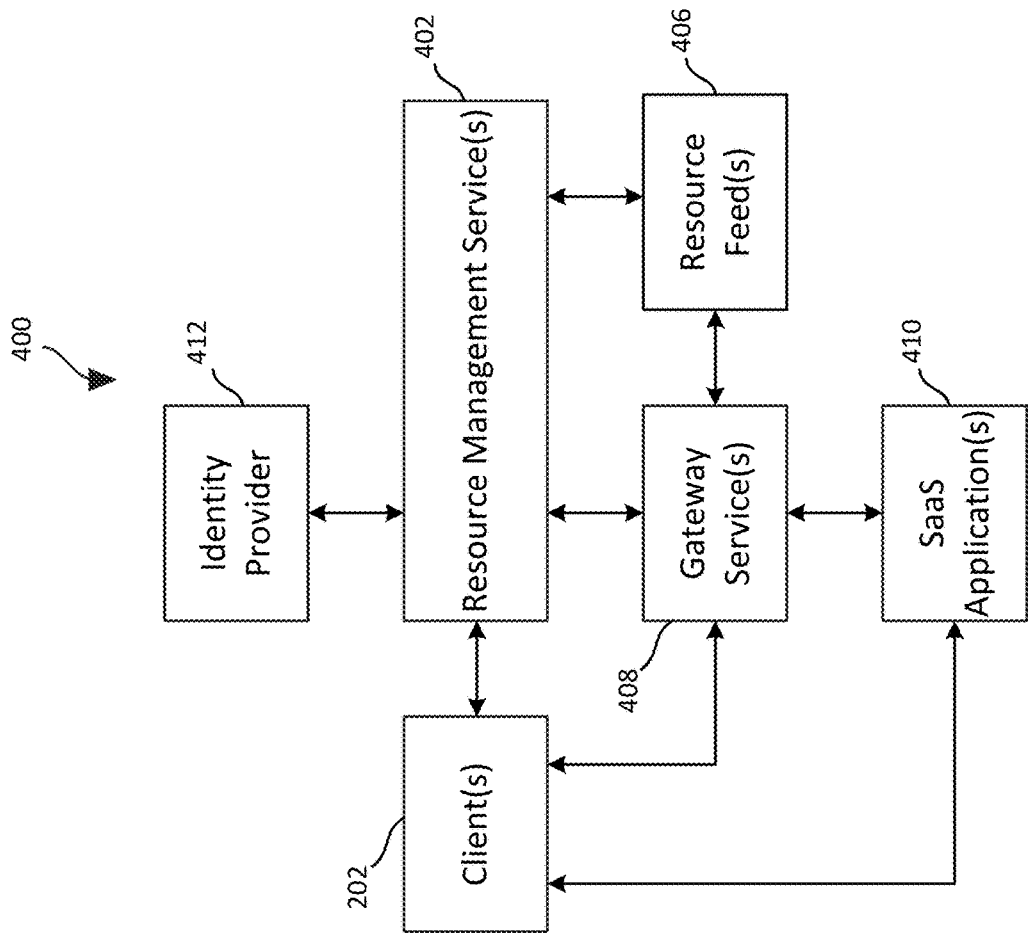
FIG. 4A is a block diagram of an example system in which resource management services may manage and streamline access by clients to resource feeds (via one or more gateway services) and/or software-as-a-service (SaaS) applications.

D. Systems and Methods for Managing and Streamlining Access by Client Devices to a Variety of Resources FIG. 4A is a block diagram of an example system 400 in which one or more resource management services 402 may manage and streamline access by one or more clients 202 to one or more resource feeds 406 (via one or more gateway services 408) and/or one or more software-as-a-service (SaaS) applications 410. In particular, the resource management service(s) 402 may employ an identity provider 412 to authenticate the identity of a user of a client 202 and, following authentication, identify one of more resources the user is authorized to access. In response to the user selecting one of the identified resources, the resource management service(s) 402 may send appropriate access credentials to the requesting client 202, and the client 202 may then use those credentials to access the selected resource. For the resource feed(s) 406, the client 202 may use the supplied credentials to access the selected resource via a gateway service 408. For the SaaS application(s) 410, the client 202 may use the credentials to access the selected application directly.

The client(s) 202 may be any type of computing devices capable of accessing the resource feed(s) 406 and/or the SaaS application(s) 410, and may, for example, include a variety of desktop or laptop computers, smartphones, tablets, etc. The resource feed(s) 406 may include any of numerous resource types and may be provided from any of numerous locations. In some embodiments, for example, the resource feed(s) 406 may include one or more systems or services for providing virtual applications and/or desktops to the client(s) 202, one or more file repositories and/or file sharing systems, one or more secure browser services, one or more access control services for the SaaS applications 410, one or more management services for local applications on the client(s) 202, one or more internet enabled devices or sensors, etc. Each of the resource management service(s) 402, the resource feed(s) 406, the gateway service(s) 408, the SaaS application(s) 410, and the identity provider 412 may be located within an on-premises data center of an organization for which the system 400 is deployed, within one or more cloud computing environments, or elsewhere.

Figure 4B:
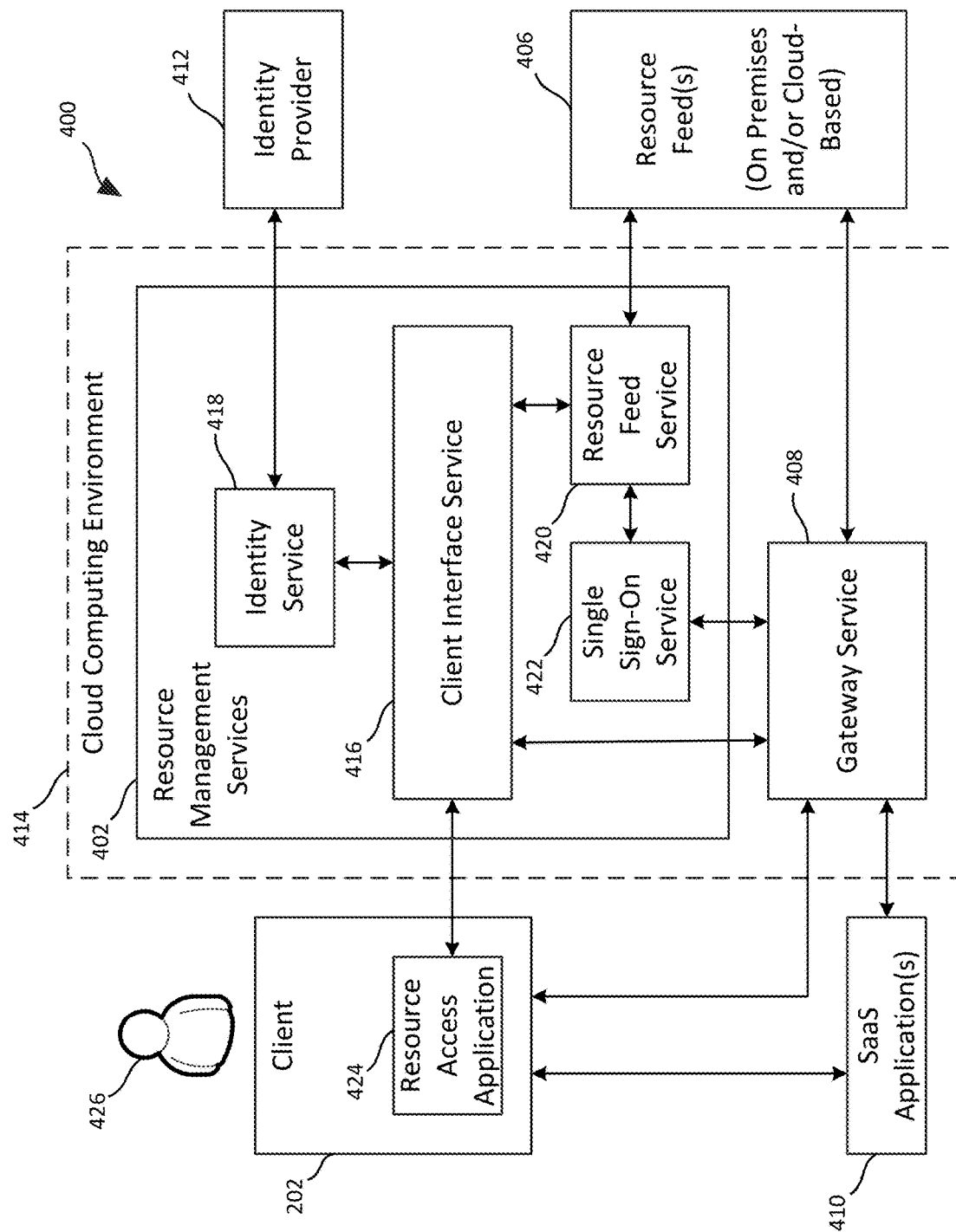
FIG. 4B is a block diagram showing an example implementation of the system shown in FIG. 4A in which various resource management services as well as a gateway service are located within a cloud computing environment.

FIG. 4B is a block diagram showing an example implementation of the system 400 shown in FIG. 4A in which various resource management services 402 as well as a gateway service 408 are located within a cloud computing environment 414. The cloud computing environment may, for example, include Microsoft Azure Cloud, Amazon Web Services, Google Cloud, or IBM Cloud.

For any of illustrated components (other than the client 202) that are not based within the cloud computing environment 414, cloud connectors (not shown in FIG. 4B) may be used to interface those components with the cloud computing environment 414. Such cloud connectors may, for example, run on Windows Server instances hosted in resource locations and may create a reverse proxy to route traffic between the site(s) and the cloud computing environment 414. In the illustrated example, the cloud-based resource management services 402 include a client interface service 416, an identity service 418, a resource feed service 420, and a single sign-on service 422. As shown, in some embodiments, the client 202 may use a resource access application 424 to communicate with the client interface service 416 as well as to present a user interface on the client 202 that a user 426 can operate to access the resource feed(s) 406 and/or the SaaS application(s) 410. The resource access application 424 may either be installed on the client 202, or may be executed by the client interface service 416 (or elsewhere in the system 400) and accessed using a web browser (not shown in FIG. 4B) on the client 202.

As explained in more detail below, in some embodiments, the resource access application 424 and associated components may provide the user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 424 is launched or otherwise accessed by the user 426, the client interface service 416 may send a sign-on request to the identity service 418. In some embodiments, the identity provider 412 may be located on the premises of the organization for which the system 400 is deployed. The identity provider 412 may, for example, correspond to an on-premises Windows Active Directory. In such embodiments, the identity provider 412 may be connected to the cloud-based identity service 418 using a cloud connector (not shown in FIG. 4B), as described above. Upon receiving a sign-on request, the identity service 418 may cause the resource access application 424 (via the client interface service 416) to prompt the user 426 for the user's authentication credentials (e.g., user-name and password). Upon receiving the user's authentication credentials, the client interface service 416 may pass the credentials along to the identity service 418, and the identity service 418 may, in turn, forward them to the identity provider 412 for authentication, for example, by comparing them against an Active Directory domain. Once the identity service 418 receives confirmation from the identity provider 412 that the user's identity has been properly authenticated, the client interface service 416 may send a request to the resource feed service 420 for a list of subscribed resources for the user 426.

In other embodiments (not illustrated in FIG. 4B), the identity provider 412 may be a cloud-based identity service, such as a Microsoft Azure Active Directory. In such embodiments, upon receiving a sign-on request from the client interface service 416, the identity service 418 may, via the client interface service 416, cause the client 202 to be redirected to the cloud-based identity service to complete an authentication process. The cloud-based identity service may then cause the client 202 to prompt the user 426 to enter the user's authentication credentials. Upon determining the user's identity has been properly authenticated, the cloud-based identity service may send a message to the resource access application 424 indicating the authentication attempt was successful, and the resource access application 424 may then inform the client interface service 416 of the successfully authentication. Once the identity service 418 receives confirmation from the client interface service 416 that the user's identity has been properly authenticated, the client interface service 416 may send a request to the resource feed service 420 for a list of subscribed resources for the user 426.

For each configured resource feed, the resource feed service 420 may request an identity token from the single sign-on service 422. The resource feed service 420 may then pass the feed-specific identity tokens it receives to the points of authentication for the respective resource feeds 406. Each resource feed 406 may then respond with a list of resources configured for the respective identity. The resource feed service 420 may then aggregate all items from the different feeds and forward them to the client interface service 416, which may cause the resource access application 424 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 410 to which the user 426 has subscribed. The lists of local applications and the SaaS applications 410 may, for example, be supplied by resource feeds 406 for respective services that manage which such applications are to be made available to the user 426 via the resource access application 424. Examples of SaaS applications 410 that may be managed and accessed as described herein include Microsoft Office 365 applications, SAP SaaS applications, Workday applications, etc.

For resources other than local applications and the SaaS application(s) 410, upon the user 426 selecting one of the listed available resources, the resource access application 424 may cause the client interface service 416 to forward a request for the specified resource to the resource feed service 420. In response to receiving such a request, the resource feed service 420 may request an identity token for the corresponding feed from the single sign-on service 422. The resource feed service 420 may then pass the identity token received from the single sign-on service 422 to the client interface service 416 where a launch ticket for the resource may be generated and sent to the resource access application 424. Upon receiving the launch ticket, the resource access application 424 may initiate a secure session to the gateway service 408 and present the launch ticket. When the gateway service 408 is presented with the launch ticket, it may initiate a secure session to the appropriate resource feed and present the identity token to that feed to seamlessly authenticate the user 426. Once the session initializes, the client 202 may proceed to access the selected resource.

When the user 426 selects a local application, the resource access application 424 may cause the selected local application to launch on the client 202. When the user 426 selects a SaaS application 410, the resource access application 424 may cause the client interface service 416 request a one-time uniform resource locator (URL) from the gateway service 408 as well a preferred browser for use in accessing the SaaS application 410. After the gateway service 408 returns the one-time URL and identifies the preferred browser, the client interface service 416 may pass that information along to the resource access application 424. The client 202 may then launch the identified browser and initiate a connection to the gateway service 408. The gateway service 408 may then request an assertion from the single sign-on service 422. Upon receiving the assertion, the gateway service 408 may cause the identified browser on the client 202 to be redirected to the logon page for identified SaaS application 410 and present the assertion. The SaaS may then contact the gateway service 408 to validate the assertion and authenticate the user 426. Once the user has been authenticated, communication may occur directly between the identified browser and the selected SaaS application 410, thus allowing the user 426 to use the client 202 to access the selected SaaS application 410.

In some embodiments, the preferred browser identified by the gateway service 408 may be a specialized browser embedded in the resource access application 424 (when the resource application is installed on the client 202) or provided by one of the resource feeds 406 (when the resource application 424 is located remotely), e.g., via a secure browser service. In such embodiments, the SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have the client interface service 416 send the link to a secure browser service, which may start a new virtual browser session with the client 202, and thus allow the user to access the potentially harmful linked content in a safe environment.

In some embodiments, in addition to or in lieu of providing the user 426 with a list of resources that are available to be accessed individually, as described above, the user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 426 of something that requires the user's attention (e.g., approval of an expense report, new course available for registration, etc.).

Figure 4C:
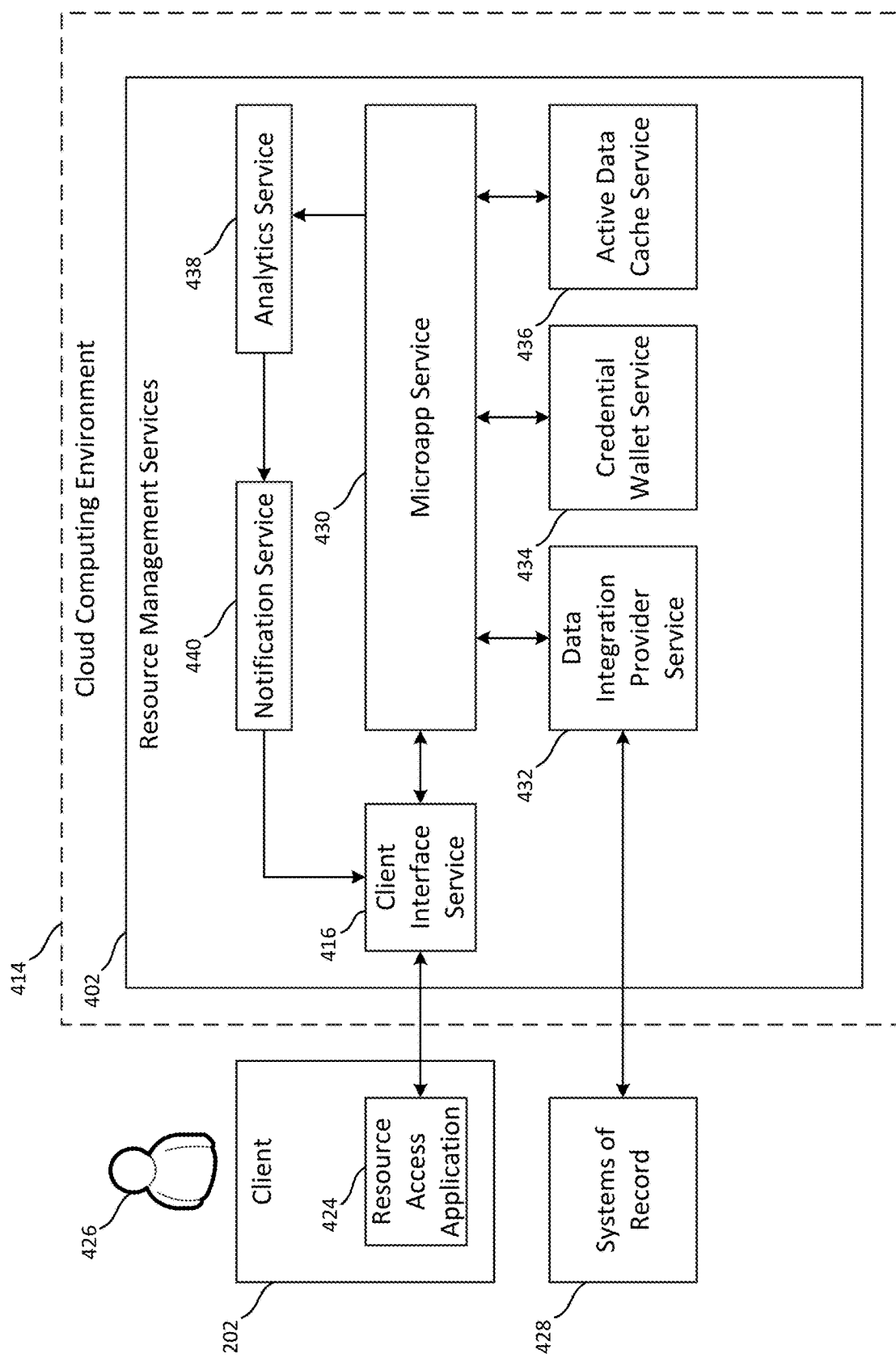
FIG. 4C is a block diagram similar to that shown in FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for a client 202. In the example shown, in addition to the client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 424 without having to launch the native application. The system shown in FIG. 4C may, for example, aggregate relevant notifications, tasks, and insights, and thereby give the user 426 a dynamic productivity tool. In some embodiments, the resource activity feed may be intelligently populated by utilizing machine learning and artificial intelligence (AI) algorithms. Further, in some implementations, microapps may be configured within the cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, the systems of record 428 may represent the applications and/or other resources the resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 402, and in particular the data integration provider service 432, may, for example, support REST API, JSON, OData-JSON, and 6ML. As explained in more detail below, the data integration provider service 432 may also write back to the systems of record, for example, using OAuth2 or a service account.

In some embodiments, the microapp service 430 may be a single-tenant service responsible for creating the microapps. The microapp service 430 may send raw events, pulled from the systems of record 428, to the analytics service 438 for processing. The microapp service may, for example, periodically pull active data from the systems of record 428.

In some embodiments, the active data cache service 436 may be single-tenant and may store all configuration information and microapp data. It may, for example, utilize a per-tenant database encryption key and per-tenant database credentials.

In some embodiments, the credential wallet service 434 may store encrypted service credentials for the systems of record 428 and user OAuth2 tokens.

In some embodiments, the data integration provider service 432 may interact with the systems of record 428 to decrypt end-user credentials and write back actions to the systems of record 428 under the identity of the end-user. The write-back actions may, for example, utilize a user's actual account to ensure all actions performed are compliant with data policies of the application or other resource being interacted with.

In some embodiments, the analytics service 438 may process the raw events received from the microapps service 430 to create targeted scored notifications and send such notifications to the notification service 440.

Finally, in some embodiments, the notification service 440 may process any notifications it receives from the analytics service 438. In some implementations, the notification service 440 may store the notifications in a database to be later served in a notification feed. In other embodiments, the notification service 440 may additionally or alternatively send the notifications out immediately to the client 202 as a push notification to the user 426.

In some embodiments, a process for synchronizing with the systems of record 428 and generating notifications may operate as follows. The microapp service 430 may retrieve encrypted service account credentials for the systems of record 428 from the credential wallet service 434 and request a sync with the data integration provider service 432. The data integration provider service 432 may then decrypt the service account credentials and use those credentials to retrieve data from the systems of record 428. The data integration provider service 432 may then stream the retrieved data to the microapp service 430. The microapp service 430 may store the received systems of record data in the active data cache service 436 and also send raw events to the analytics service 438. The analytics service 438 may create targeted scored notifications and send such notifications to the notification service 440. The notification service 440 may store the notifications in a database to be later served in a notification feed and/or may send the notifications out immediately to the client 202 as a push notification to the user 426.

In some embodiments, a process for processing a user-initiated action via a microapp may operate as follows. The client 202 may receive data from the microapp service 430 (via the client interface service 416) to render information corresponding to the microapp. The microapp service 430 may receive data from the active data cache service 436 to support that rendering. The user 426 may invoke an action from the microapp, causing the resource access application 424 to send that action to the microapp service 430 (via the client interface service 416). The microapp service 430 may then retrieve from the credential wallet service 434 an encrypted Oauth2 token for the system of record for which the action is to be invoked, and may send the action to the data integration provider service 432 together with the encrypted Oath2 token. The data integration provider service 432 may then decrypt the Oath2 token and write the action to the appropriate system of record under the identity of the user 426. The data integration provider service 432 may then read back changed data from the written-to system of record and send that changed data to the microapp service 430. The microapp service 432 may then update the active data cache service 436 with the updated data and cause a message to be sent to the resource access application 424

(via the client interface service 416) notifying the user 426 that the action was successfully completed.

In some embodiments, in addition to or in lieu of the functionality described above, the resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 402 may, for example, parse these requests and respond because they are integrated with multiple systems on the back-end. In some embodiments, users may be able to interact with the virtual assistance through either the resource access application 424 or directly from another resource, such as Microsoft Teams. This feature may allow employees to work efficiently, stay organized, and deliver only the specific information they're looking for.

Figure 5:
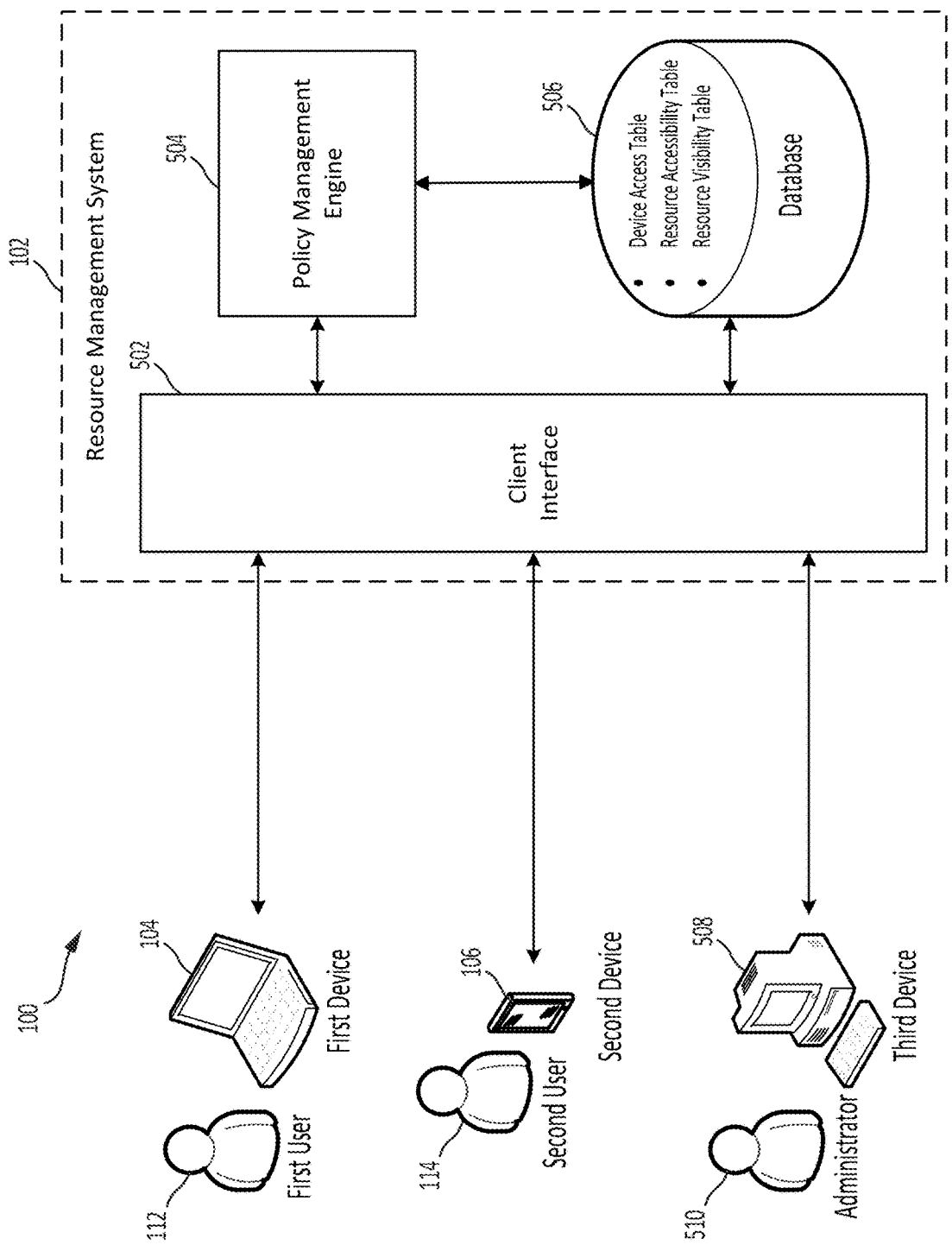
FIG. 5 is block diagram showing additional details of the example system for managing the visibility and/or accessibility of resources introduced in connection with FIG. 1.

E. Detailed Description of Example Embodiments of a Time-Based Resource Management System FIG. 5 shows additional details of the example system 100 for managing the visibility and/or accessibility of resources that was introduced above in connection with FIG. 1. As shown, in some embodiments, the resource management system 102 may include a client interface 502, a policy management engine 504, and a database 506. In addition, the system 100 may further include a third device 508 which, as shown, may be operated by a system administrator 510. The role the system administrator 510 may play with respect to management of the availability and/or accessibility of computing resources is described in more detail below.

In some embodiments, the first device 104, the second device 106, and the third device 508 may each correspond to any one of the clients 202 described above in connection with FIGS. 2A-B, 3, and 4A-C, and the resource management system 102 may correspond to or operate in association with any of the servers 204 that provide one or more services to those clients 202. In some embodiments, for example, the resource management system 102 may be included within the resource management services 402 described above in connection with FIGS. 4A-C. In at least some such embodiments, the functionality of the client interface 502 described herein may, for example, be implemented by the client interface service 416 shown in FIGS. 4B and 4C (or by a separate service that may be called by the client interface service 416).

Examples of tables that may be stored by the database 506, including the resource visibility table 108 and the device access table 110 shown in FIG. 1, as well as a resource accessibility table 602, are shown in FIG. 6. Example routines that may be performed by each of the first device 104, the second device 106, and the third device 508 are described below in connection with FIGS. 7A and 7B. An example routine that may be performed by the client interface 502 is described below in connection with FIG. 11. Example routines that may be performed by the policy management engine 504 are described below in connection with FIGS. 12A and 12B.

Figure 7A:
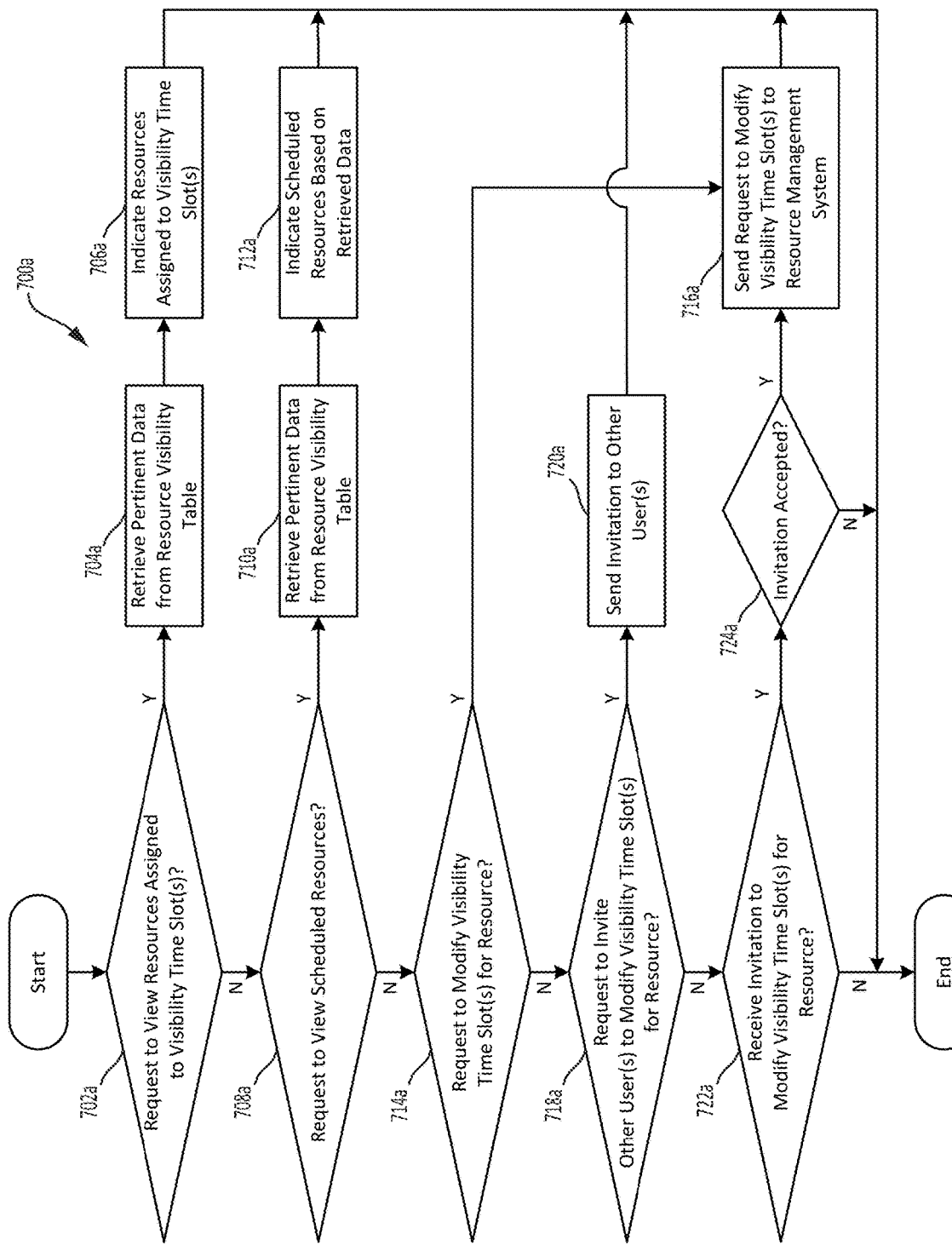
FIG. 7A shows an example routine that may be repeatedly executed by the respective clients shown in FIG. 5 to allow each client to view and/or manage the visibility of resources to that client based on time slots in accordance with some embodiments.
Figure 8:
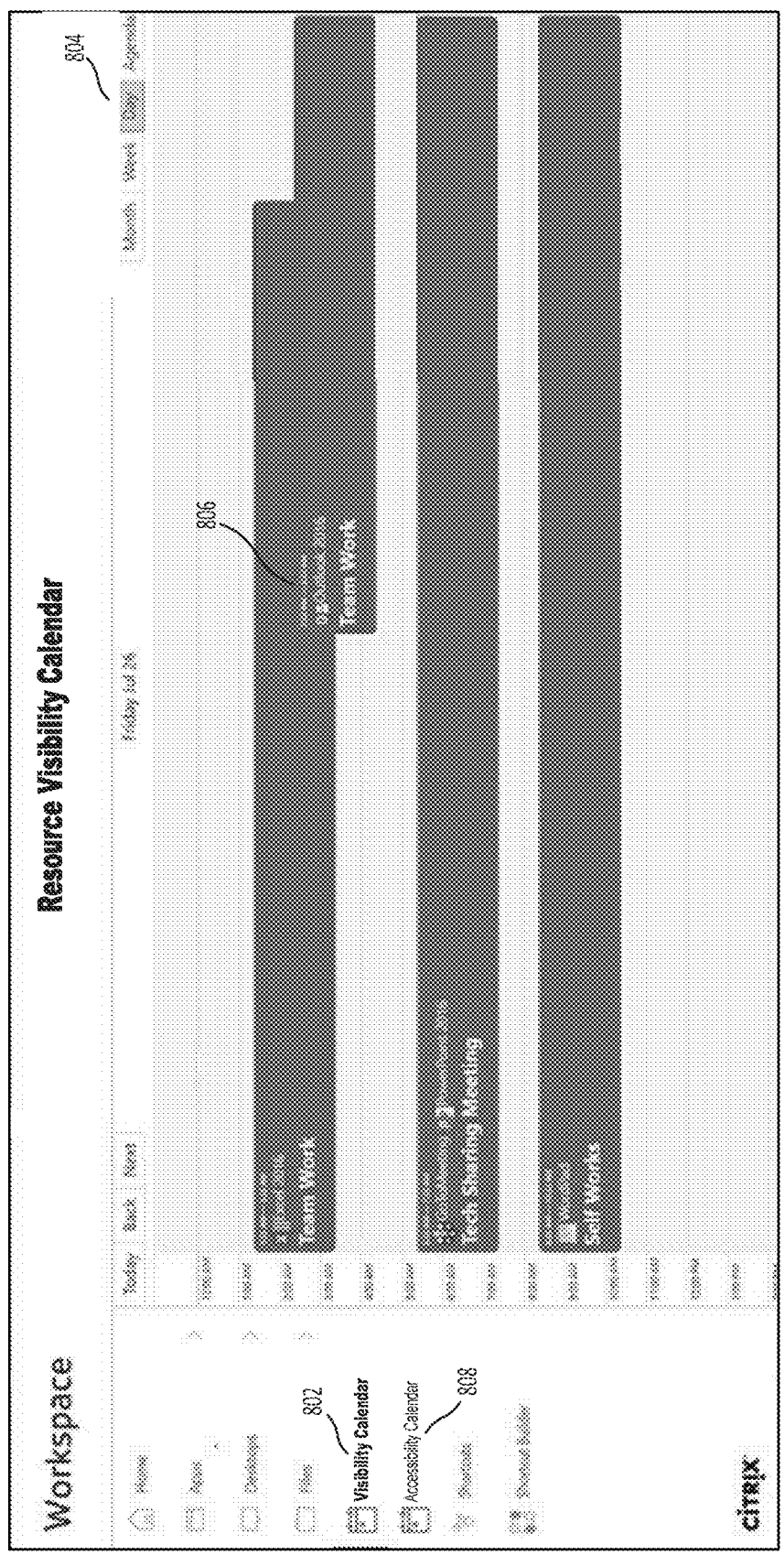
FIG. 8 shows an example of a screen that may be presented via a user interface of a client device shown in FIG. 5 to assign and/or view visibility and/or accessibility time slots for managed resources for a particular day.
Figure 9:
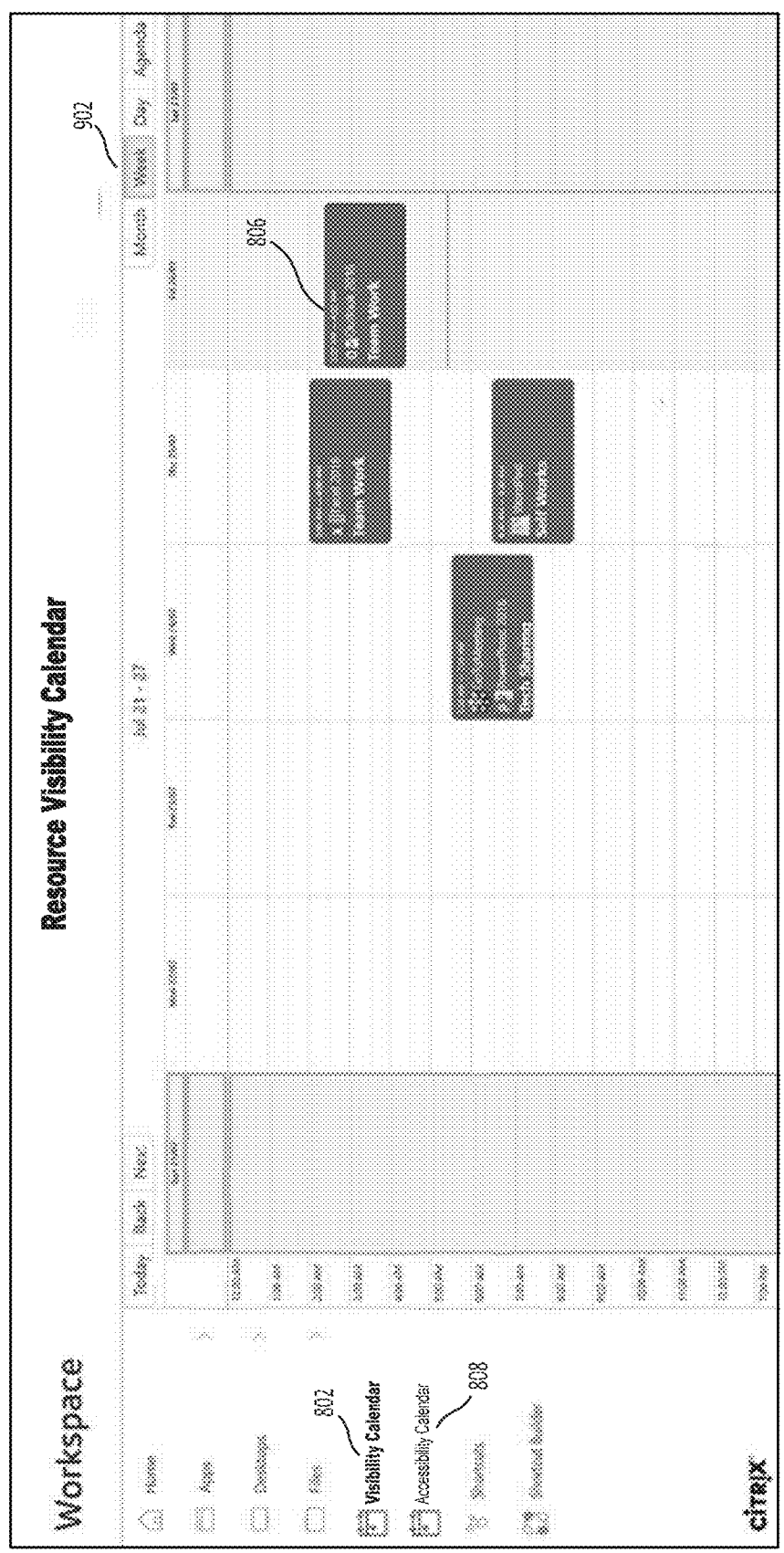
FIG. 9 shows an example of a screen that may be presented via a user interface of a client device shown in FIG. 5 to assign and/or view visibility and/or accessibility time slots for managed resources for a particular week.
Figure 10:
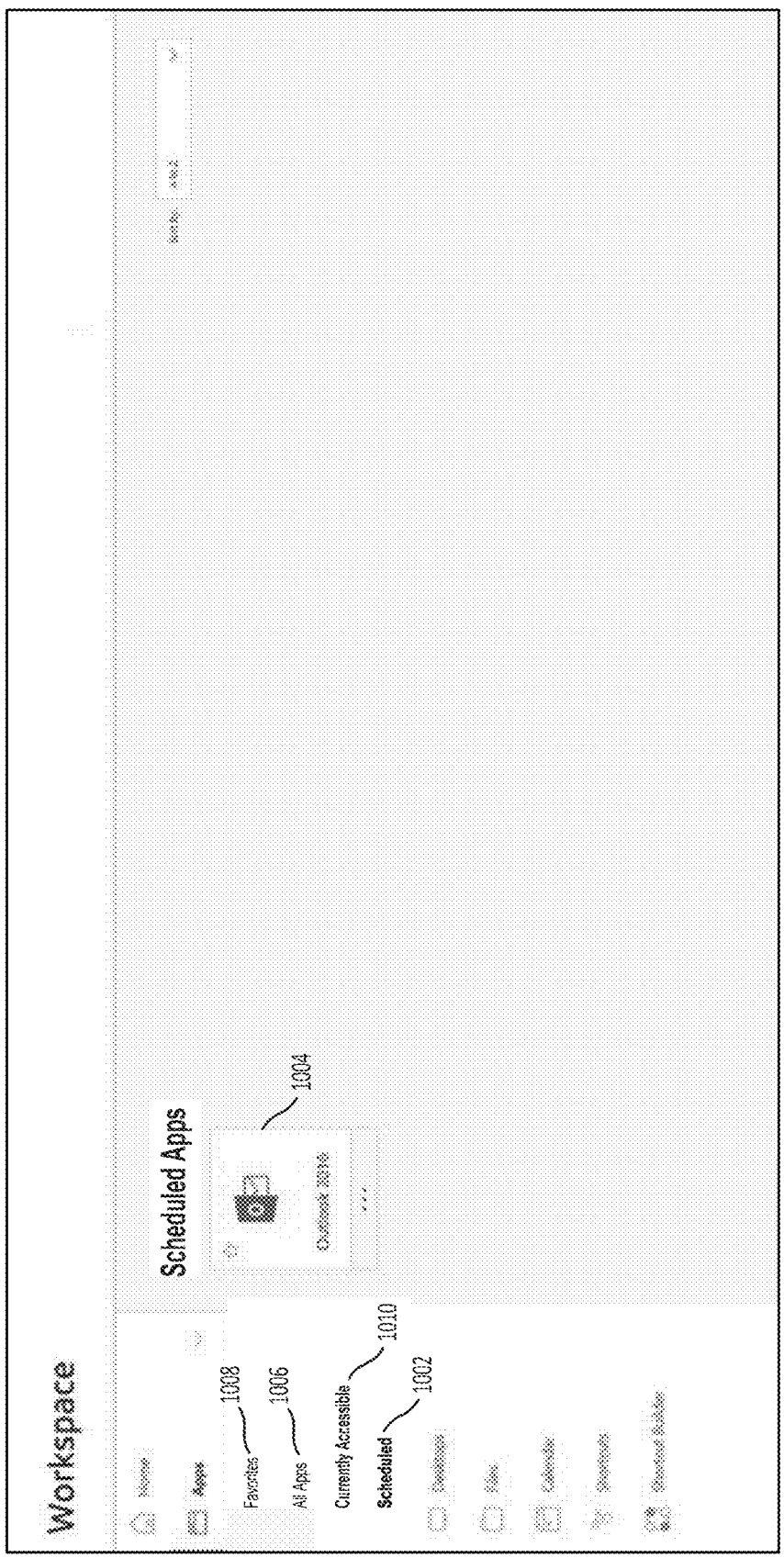
FIG. 10 shows an example of a screen that may be presented via a user interface of a client device shown in FIG. 5 to indicate currently-available resources based on assigned visibility and/or accessibility time slots for managed resources.

FIG. 7A illustrates an example routine 700a that may be repeatedly executed by each of the first device 104, the second device 106, and the third device 508 to implement functionality of a user interface relating to the time-based management of the visibility of computing resources by particular users and/or client devices. Example screens of a user interface that may be presented on a client device to enable such time-based management are shown in FIGS. 8-10.

As shown in FIG. 7A, at a step 702a, a determination may be made as to whether a user has manipulated a user interface to request to view computing resources that have been assigned to visibility time slots. In some embodiments, such a request may, for example, correspond a user selecting a user interface element corresponding to a request to view a "resource visibility calendar." User interface element 802 (labeled "Visibility Calendar") shown in FIGS. 8 and 9 is an example of such a user interface element.

When a request to view computing resources that have been assigned to visibility time slots is detected, the routine 700a may proceed to a step 704a, at which pertinent data from the resource visibility table 108 (shown in FIG. 6) may be retrieved. In some embodiments, for example, the client device that detected the request at the step 702a may send a request for pertinent resource visibility time slot data to the client interface 502 of the resource management system 102. Such a request may, for example, correspond to the "request for resource visibility time slot data" that is described below in connection with step 1110 of the routine 1100 (which may be executed by the client interface 502 of the resource management system 102). The request sent to the resource management system 102 may identify a user of the client device from which the request originates and/or the client device itself to enable the resource management system 102 to retrieve the correct data for the requesting client device from the resource visibility table 108. In some implementations, a request sent by the third device 508 (operated by the system administrator 510) to the resource management system 102 at the step 704a may identify another user and/or another client device to enable the resource management system 102 to retrieve pertinent data for the other user and/or client device from the resource visibility table 108, for example, when the system administrator 510 desires to view and/or manage a "resource visibility calendar" for another user and/or device, as described below.

Once the pertinent data from the resource visibility table 108 has been retrieved from the resource management system 102, the client device may, at a step 706a, present a user interface indicating the resource(s) that have been assigned one or more visibility time slots, as reflected by the retrieved data. The "resource visibility calendar" screens shown in FIGS. 8 and 9 are examples of user interfaces that may be displayed for that purpose. In particular, FIG. 8 shows an example screen of a resource visibility calendar for a single day, as selected by a user interface element 804 (labeled "Day"), and FIG. 9 shows an example screen of a resource visibility calendar for a single week, as selected by a user interface element 902 (labeled "Week"), which encompasses the single day corresponding to FIG. 8. In the example shown, a single resource ("Outlook 2016") has been assigned to a time slot 806 between 2:22 a.m. and 4:22 a.m. on Friday, July 26. The calendar screens shown in FIGS. 8 and 9, including the entry for the time slot 806, may be rendered based on the resource visibility data that was retrieved at the step 704a.

At a step 708a, a determination may be made as to whether a user has manipulated a user interface to request to view computing resources that have been scheduled to be visible at the time the request is made. In some embodiments, such a request may, for example, correspond to selection of a user interface element corresponding to a request to view "scheduled" resources of a particular type. User interface element 1002 (labeled "Scheduled") shown in FIG. 10 is an example of such a user interface element. In the example shown, the user interface element 1002 may correspond to an option to view all applications that have been scheduled, e.g., via the calendars shown in FIGS. 8 and 9, to be visible at the time the option is selected.

When a request to view resources scheduled to be visible is detected (at the step 708*a*), the routine 700*a* may proceed to a step 710*a*, at which pertinent data from the resource visibility table 108 (shown in FIG. 6) may be retrieved. In some embodiments, for example, the client device that detected the request at the step 708*a* may send a request for pertinent resource visibility time slot data to the client interface 502 of the resource management system 102. Such a request may, for example, correspond to the "request for resource visibility time slot data" that is described below in connection with step 1110 of the routine 1100 (which may be executed by the client interface 502 of the resource management system 102). The request sent to the resource management system 102 may identify a user of the client device from which the request originates and/or the client device itself to enable the resource management system 102 to retrieve the correct data for the requesting client device from the resource visibility table 108. In some embodiments, the resource management system 102 may compare the current time to time slot data in the resource visibility table 108 to identify the managed resources that are associated with the requesting user and/or client device and for which the current time falls within an associated time slot. In such embodiments, the resource management system 102 may send to the requesting client data concerning the resources that are so identified at the time the request is made. In other embodiments, the resource management system 102 may send to the requesting client additional data from the resource visibility table 108, including the time slot data, that is associated with the requesting user and/or client device, and the requesting client device may compare the current time to the received time slot data to determine the resources that are to be indicated as being available, as discussed below.

Once the pertinent data from the resource visibility table 108 has been retrieved from the resource management system 102, the client device may, at a step 712*a*, present a user interface indicating the resource(s) that have been scheduled to be visible at the current time, as reflected by the retrieved data. The "Scheduled Apps" screen shown in FIG. 10 is an example of user interface that may be displayed for that purpose. In particular, FIG. 10 indicates that only a single resource 1004 ("Outlook 2016") has been scheduled to be access at the current time. For instance, the screen shown in FIG. 10 may correspond to selection of the user interface element at a time within the time slot 806 (shown in FIGS. 8 and 9), i.e., between 2:22 a.m. and 4:22 a.m. on Friday, July 26. Subsequent selection of the user interface element 1002 at 4:23 a.m. on the same day may, based on the time slot data indicated in FIGS. 8 and 9, result in the resource 1004 ceasing to appear on the "Scheduled Apps" screen shown in FIG. 10.

In some implementations, the system may additionally permit a user to separately select, e.g., via a user interface element 1006, an "all" resources option to view all resources of a given type, e.g., "all apps," that are accessible by that user and/or client device, whether or not such resources have been scheduled to be visible to that user and/or client device at the time in question, in case the user wishes to access a resource that has not been "scheduled" to be visible at that time. Alternatively, in other implementations, resources that have been scheduled to be "visible" at the current time may be identified within a list of "all" resources of a particular type that are currently accessible by that user and/or client device, e.g., by highlighting or labeling them as scheduled, and may additionally or alternatively be presented at the beginning of such a list for easy access. In still other implementations, scheduled "visible" resources may be included within a "favorites" list, e.g., accessed via user interface element 1008, and also identified within the such a list, e.g., by highlighting or labeling them as scheduled, and may additionally or alternatively be presented at the beginning of such a list for easy access.

At a step 714*a*, a determination may be made as to whether a user has manipulated a user interface to request modification to the visibility time slot data for a resource. In some embodiments, such a request may, for example, correspond to a user selecting an option to add or delete a resource within a time slot of a calendar screen, such as those shown in FIGS. 8 and 9. Such a request may, for example, be made by the first user 112 or the second user 114 (shown in FIGS. 1 and 5) to modify a time slot for a calendar associated with that user, or may be made by the system administrator 510 to modify a time slot for a calendar associated with another user. In some embodiments, for example, a user may be permitted to select a time slot and enter data identifying a resource to be added to such a time slot. The user may, for example, be presented with a pop-up window in which the name of a computing resource to be added to the calendar may be entered. Alternatively, the user may be presented with a list of "accessible" resources and may select a resource from such a list. As yet another alternative, a user presented with a list of "all" or "favorite" resources of a particular type, e.g., "all apps," and may right or left-click on, or otherwise select, a particular resource and indicate, e.g., via a drop down menu or the like, that the user desires to add that particular resource to a scheduled resources calendar. In response, the user may be presented a calendar view (e.g., as shown in FIG. 8 or 9) in which one or more desired time slots for the selected resource may be identified.

Once a particular resource and one or more time slots have been determined (at the step 714*a*) the routine 700*a* may proceed to a step 716*a*, at which a request to modify the data in the resource visibility table 108 in accordance with the indicated calendar changes may be sent to the resource management system 102 for processing. The request sent to the resource management system 102 at the step 716*a* may, for example, correspond to the request that may be received by the user interface 504 of the resource management system 102 at a step 1102 of the routine 1100 shown in FIG. 11. The processing of such a modification request by the resource management system 102 is described in more detail below.

At a step 718*a*, a determination may be made as to whether a user has manipulated a user interface to request that an invitation be sent to one or more other users suggesting a modification to resource-specific visibility time slot data for such user(s). In some embodiments, such a request may, for example, correspond to a user causing a calendar invitation reflecting the suggested modification to be sent to the other user(s). For example, by "opening" one of the time slot entries in a calendar view, e.g., such as the calendar screen shown in FIG. 8 or 9, e.g., by double-clicking on an entry, the user may be provided with an option to invite other users to join the scheduled "event."

When a request to send an invitation to others suggesting a modification to resource-specific visibility time slot data is detected (at the step 718a), the routine 700a may proceed to a step 720a, at which the requested invitation may be sent to the other users, e.g., as an emailed calendar invitation.

At a step 722a, a determination may be made as to whether an invitation suggesting a modification to resource-specific visibility time slot data has been received from another user, e.g., as an emailed calendar invitation. When such an invitation is received (at the step 722a), the routine may proceed to a step 724a, at which a determination may be made as to whether the invitation has been accepted by the recipient. Upon acceptance of the invitation (at the step 724a), a request to modify the data in the resource visibility table 108 in accordance with the information included in the calendar invitation may be sent (at the step 716a) to the resource management system 102 for processing. As noted above, the request sent to the resource management system 102 at the step 716a may, for example, correspond to the request that may be received by the user interface 504 of the resource management system 102 at a step 1102 of the routine 1100 shown in FIG. 11, which is described in more detail below.

Figure 7B:
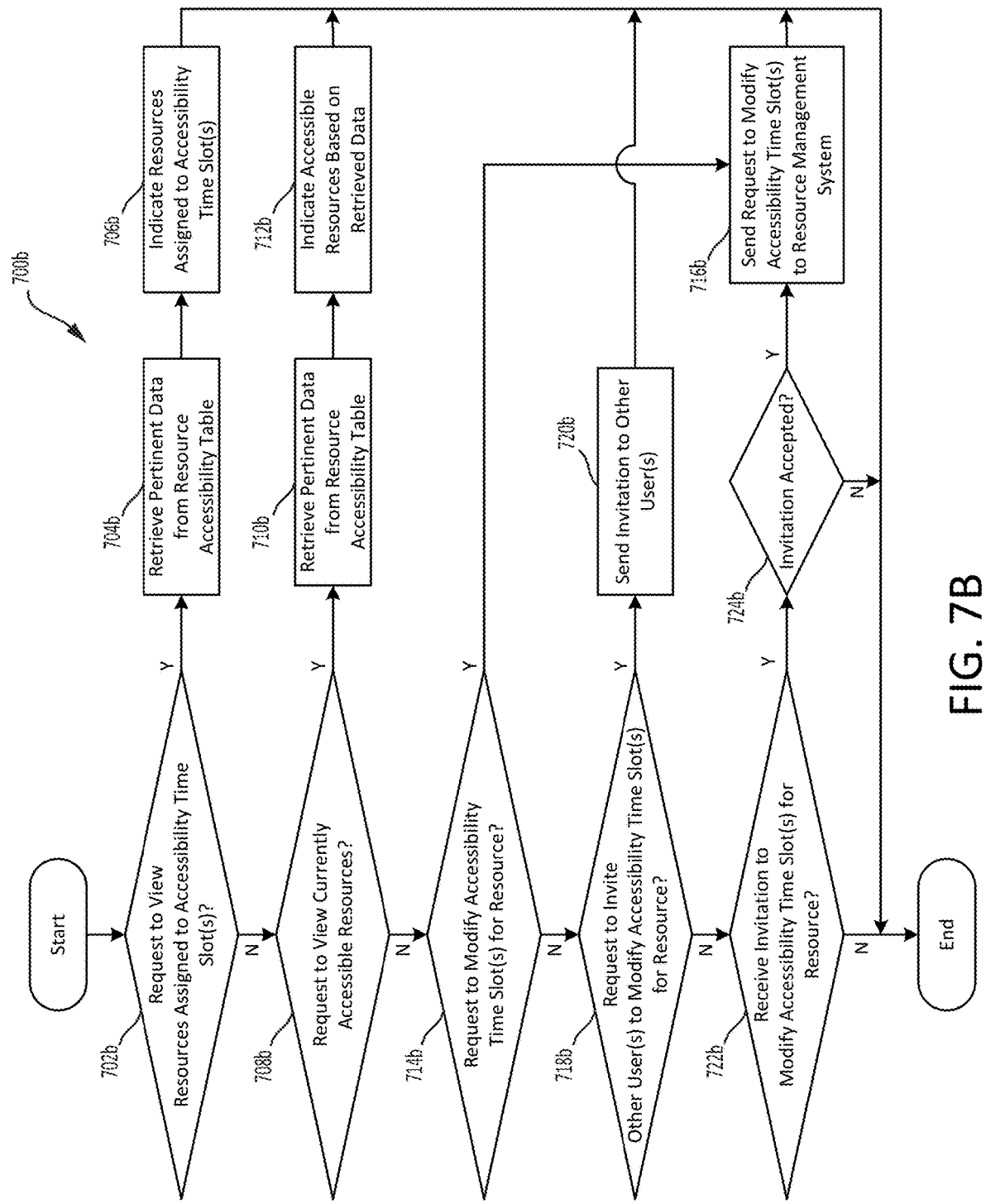
FIG. 7B shows an example routine that may be repeatedly executed by the respective clients shown in FIG. 5 to allow each client to view and/or manage the accessibility of resources by that client based on time slots in accordance with some embodiments.

FIG. 7B illustrates an example routine 700b that may be repeatedly executed by each of the first device 104, the second device 106, and the third device 508 to implement functionality of a user interface relating to the time-based management of the accessibility of computing resources by particular users and/or client devices. As the routine 700b shown is FIG. 7B is similar to the routine 700a shown in FIG. 7A in many respects, a slightly less detailed description of the routine 700b will be provided.

As shown in FIG. 7B, at a step 702b, a determination may be made as to whether a user has manipulated a user interface to request to view computing resources that have been assigned to accessibility time slots. In some embodiments, such a request may, for example, correspond a user selecting a user interface element corresponding to a request to view a "resource accessibility calendar." User interface element 808 (labeled "Accessibility Calendar") shown in FIGS. 8 and 9 is an example of such a user interface element.

When a request to view computing resources that have been assigned to accessibility time slots is detected, the routine 700b may proceed to a step 704b, at which pertinent data from the resource accessibility table 602 (shown in FIG. 6) may be retrieved. In some embodiments, for example, the client device that detected the request at the step 702b may send a request for pertinent resource accessibility time slot data to the client interface 502 of the resource management system 102. Such a request may, for example, correspond to the "request for resource accessibility time slot data" that is described below in connection with step 1116 of the routine 1100 (which may be executed by the client interface 502 of the resource management system 102). The request sent to the resource management system 102 may identify a user of the client device from which the request originates and/or the client device itself to enable the resource management system 102 to retrieve the correct data for the requesting client device from the resource accessibility table 602. In some implementations, a request sent by the third device 508 (operated by the system administrator 510) to the resource management system 102 at the step 704b may identify another user and/or another client device to enable the resource management system 102 to retrieve pertinent data for the other user and/or client device from the resource accessibility table 602, for example, when the system administrator 510 desires to view and/or manage a "resource accessibility calendar" for another user and/or device, as described below.

Once the pertinent data from the resource accessibility table 602 has been retrieved from the resource management system 102, the client device may, at a step 706b, present a user interface indicating the resource(s) that have been assigned one or more accessibility time slots, as reflected by the retrieved data. In some embodiments, for example, a calendar screen showing specific resources in one or more time slots (similar to the calendar screens shown in FIGS. 8 and 9) may be rendered based on the resource accessibility data that was retrieved at the step 704b. In other embodiments, rather than having separate user interface elements 802 and 808 and separate calendars for "resource accessibility" time slots and "resource visibility" time slots, a single user interface element (e.g., labeled "Calendar") may be provided and a single calendar screen may be presented with the "resource accessibility" time slots being somehow differentiated from the "resource visibility" time slots, e.g., using different colors. Alternatively, respective tabs may be provided on a calendar screen that enable a user to select one of the two calendar views, e.g., "a resource visibility" view and a "resource accessibility" view.

At a step 708b, a determination may be made as to whether a user has manipulated a user interface to request to view computing resources that have been scheduled to be accessible at the time the request is made. In some embodiments, such a request may, for example, correspond to selection of a user interface element corresponding to a request to view "currently accessible" resources of a particular type. User interface element 1010 (labeled "Currently Accessible") shown in FIG. 10 is an example of such a user interface element. In the example shown, the user interface element 1010 may correspond to an option to view all applications that have been scheduled to be accessible by the user and/or the client device in question at the time the option is selected.

When a request to view resources scheduled to be accessible is detected (at the step 708b), the routine 700b may proceed to a step 710b, at which pertinent data from the resource accessibility table 602 (shown in FIG. 6) may be retrieved. In some embodiments, for example, the client device that detected the request at the step 708b may send a request for pertinent resource accessibility time slot data to the client interface 502 of the resource management system 102. Such a request may, for example, correspond to the "request for resource accessibility time slot data" that is described below in connection with step 1116 of the routine 1100 (which may be executed by the client interface 502 of the resource management system 102). The request sent to the resource management system 102 may identify the user of the client device and/or the client device to enable the resource management system 102 to retrieve the correct data for the requesting client device from the resource accessibility table 602. In some embodiments, the resource management system 102 may compare the current time to time slot data in the resource accessibility table 602 to identify the managed resources that are associated with the requesting user and/or client device and for which the current time falls within an associated time slot. In such embodiments, the resource management system 102 may send to the requesting client data concerning the resources that are so identified at the time the request is made. In other embodiments, the resource management system 102 may send to the requesting client additional data from the resource accessibility table 602, including the time slot data, that is associated with the requesting user and/or client device, and the requesting client device may compare the current time to the received time slot data to determine the resources that are to be indicated as being available, as discussed below.

Once the pertinent data from the resource accessibility table 602 has been retrieved from the resource management system 102, the client device may, at a step 712b, present a user interface indicating the resource(s) that have been scheduled to be accessible at the current time, as reflected by the retrieved data.

In other implementations, a user interface identifying currently accessible resources may instead be presented in response to a user selecting an option to view "all" resources of a particular type, e.g., by selecting the user interface element 1006 shown in FIG. 10. In still other implementations, when a user selects an option to view "all" resources of a particular type, by selecting the user interface element 1006, all resources of the particular type (e.g., all applications) that are accessible by that user and/or client device, whether or not such resources have been scheduled to be accessible by that user and/or client device at the current time, may be listed, and those listed resources that are currently accessible may be indicated, e.g., by highlighting them, and/or those listed resources that are not currently accessible may be indicated, e.g., by graying them out. In some implementation, the currently accessible resources may additionally or alternatively be presented at the beginning of such a list for easy access.

At a step 714b, a determination may be made as to whether a user has manipulated a user interface to request modification to the accessibility time slot data for a resource. In some embodiments, such a request may, for example, correspond to a user selecting an option to add or delete a resource within a time slot of a "resource accessibility calendar" screen, similar to those shown in FIGS. 8 and 9. Such a request may, for example, be made by the first user 112 or the second user 114 (shown in FIGS. 1 and 5) to modify a time slot for a calendar associated with that user, or may be made by the system administrator 510 to modify a time slot for a calendar associated with another user. In some embodiments, for example, a user may be permitted to select a time slot and enter data identifying a resource to be added to such a time slot. The user may, for example, be presented with a pop-up window in which the name of a computing resource to be added to the calendar may be entered. Alternatively, the user may be presented with a list of potentially "accessible" resources and may select a resource from such a list. In some implementations, a user may right or left-click on, or otherwise select, a particular resource on such a list and indicate, e.g., via a drop down menu or the like, that the user desires to add that particular resource to a "resource accessibility calendar." In response, the user may be presented a calendar view (which may, for example, be similar to the views shown in FIG. 8 or 9) in which one or more desired time slots for the selected resource may be identified.

Once a particular resource and one or more time slots have been determined (at the step 714b) the routine 700b may proceed to a step 716b, at which a request to modify the data in the resource accessibility table 602 in accordance with the indicated calendar changes may be sent to the resource management system 102 for processing. The request sent to the resource management system 102 at the step 716b may, for example, correspond to the request that may be received by the user interface 504 of the resource management system 102 at a step 1106 of the routine 1100 shown in FIG. 11. The processing of such a modification request by the resource management system 102 is described in more detail below.

At a step 718b, a determination may be made as to whether a user has manipulated a user interface to request that an invitation be sent to one or more other users suggesting a modification to resource-specific accessibility time slot data for such user(s). In some embodiments, such a request may, for example, correspond to a user causing a calendar invitation reflecting the suggested modification to be sent to the other user(s). For example, by "opening" one of the time slot entries in a calendar view, e.g., such as a calendar screen similar to that shown in FIG. 8 or 9, e.g., by double-clicking on an entry, the user may be provided with an option to invite other users to join the scheduled "event."

When a request to send an invitation to others suggesting a modification to resource-specific accessibility time slot data is detected (at the step 718b), the routine 700b may proceed to a step 720b, at which the requested invitation may be sent to the other users, e.g., as an emailed calendar invitation.

At a step 722b, a determination may be made as to whether an invitation suggesting a modification to resource-specific accessibility time slot data has been received from another user, e.g., as an emailed calendar invitation. When such an invitation is received (at the step 722b), the routine may proceed to a step 724b, at which a determination may be made as to whether the invitation has been accepted by the recipient. Upon acceptance of the invitation (at the step 724b), a request to modify the data in the resource accessibility table 602 in accordance with the information included in the calendar invitation may be sent (at the step 716b) to the resource management system 102 for processing. As noted above, the request sent to the resource management system 102 at the step 716b may, for example, correspond to the request that may be received by the user interface 504 of the resource management system 102 at a step 1106 of the routine 1100 shown in FIG. 11, which is described in more detail below.

Figure 11:
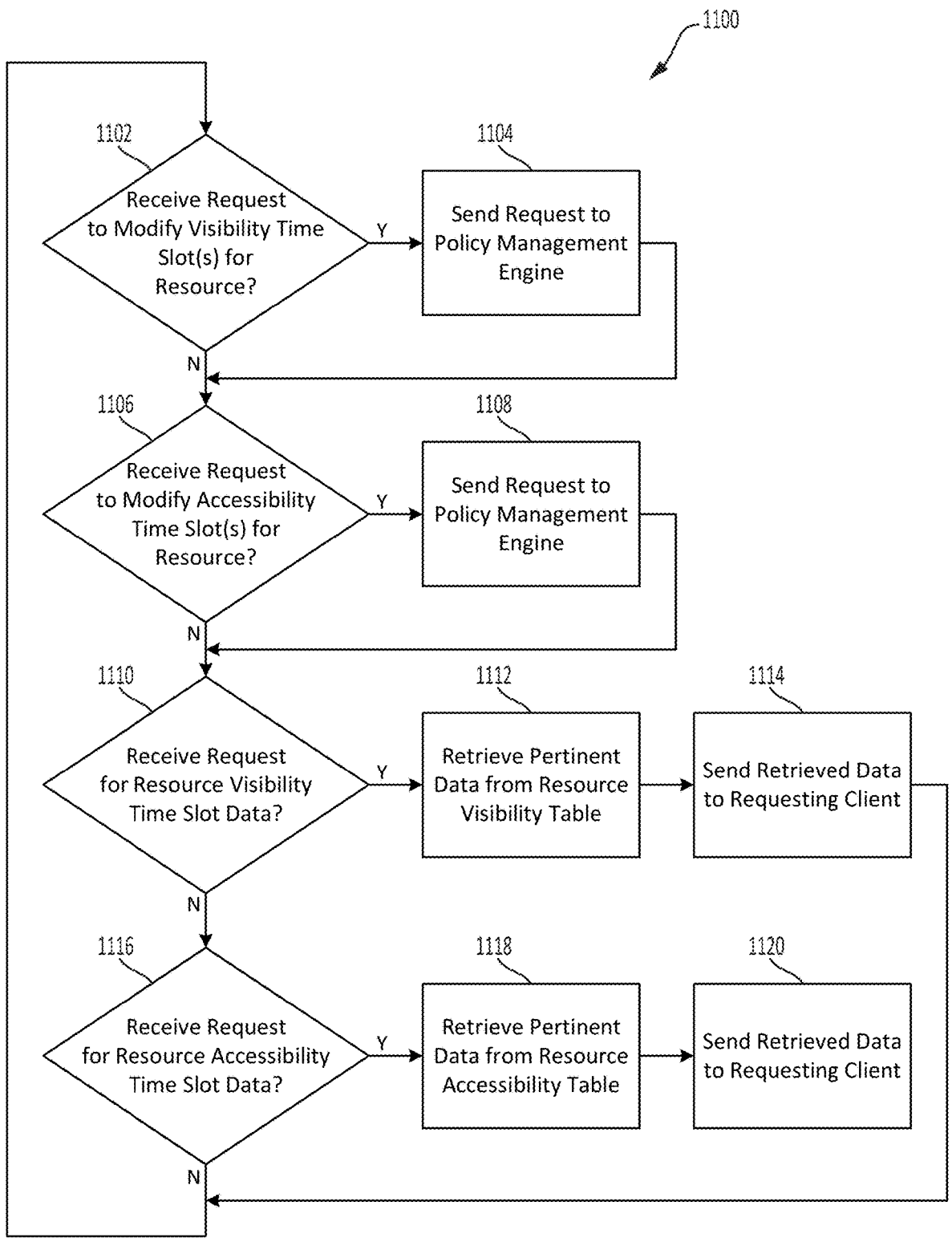
FIG. 11 shows an example routine that may be executed by client interface module shown in FIG. 5 in accordance with some embodiments.

FIG. 11 shows an example routine 1100 that may be executed by the client interface 502 shown in FIG. 5 in accordance with some embodiments. As shown, at a step 1102, a determination may be made as to whether a request has been received, from a client device, to modify resource visibility time slot data for a particular resource. Such a request may, for example, correspond to a request sent by a client device in connection with the step 716a of the routine 700a (shown in FIG. 7A). When a request to modify resource visibility time slot data is received (at the step 1102), the routine 1100 may proceed to a step 1104, at which the request may be forwarded to the policy management engine 504 (shown in FIG. 5) for processing.

Similarly, at a step 1106, a determination may be made as to whether a request has been received, from a client device, to modify resource accessibility time slot data for a particular resource. Such a request may, for example, correspond to a request sent by a client device in connection with the step 716b of the routine 700b (shown in FIG. 7B). When a request to modify resource accessibility time slot data is received (at the step 1106), the routine 1100 may proceed to a step 1108, at which the request may be forwarded to the policy management engine 504 (shown in FIG. 5) for processing.

At a step 1110, a determination may be made as to whether a request has been received, from a client device, for pertinent data from the resource visibility table 108. Such a request may, for example, correspond to a request sent by a client device in connection with the step 704a and/or the step 710a of the routine 700a (shown in FIG. 7A). When a request to retrieve pertinent resource visibility data is received (at the step 1110), the routine 1100 may proceed to a step 1112, at which the pertinent data for the requesting user and/or client device is retrieved from the resource visibility table 108 stored in the database 506 (shown in FIG. 5). At a step 1114, the retrieved data may be sent to the requesting client device to be used as discussed above in connection with the step 706a and/or the step 712a shown in FIG. 7A.

At a step 1116, a determination may be made as to whether a request has been received, from a client device, for pertinent data from the resource accessibility table 602. Such a request may, for example, correspond to a request sent by a client device in connection with the step 704b and/or the step 710b of the routine 700b (shown in FIG. 7B). When a request to retrieve pertinent resource accessibility data is received (at the step 1116), the routine 1100 may proceed to a step 1118, at which the pertinent data for the requesting user and/or client device is retrieved from the resource accessibility table 602 stored in the database 506 (shown in FIG. 5). At a step 1120, the retrieved data may be sent to the requesting client device to be used as discussed above in connection with the step 706b and/or the step 712b shown in FIG. 7B.

Figure 12A:
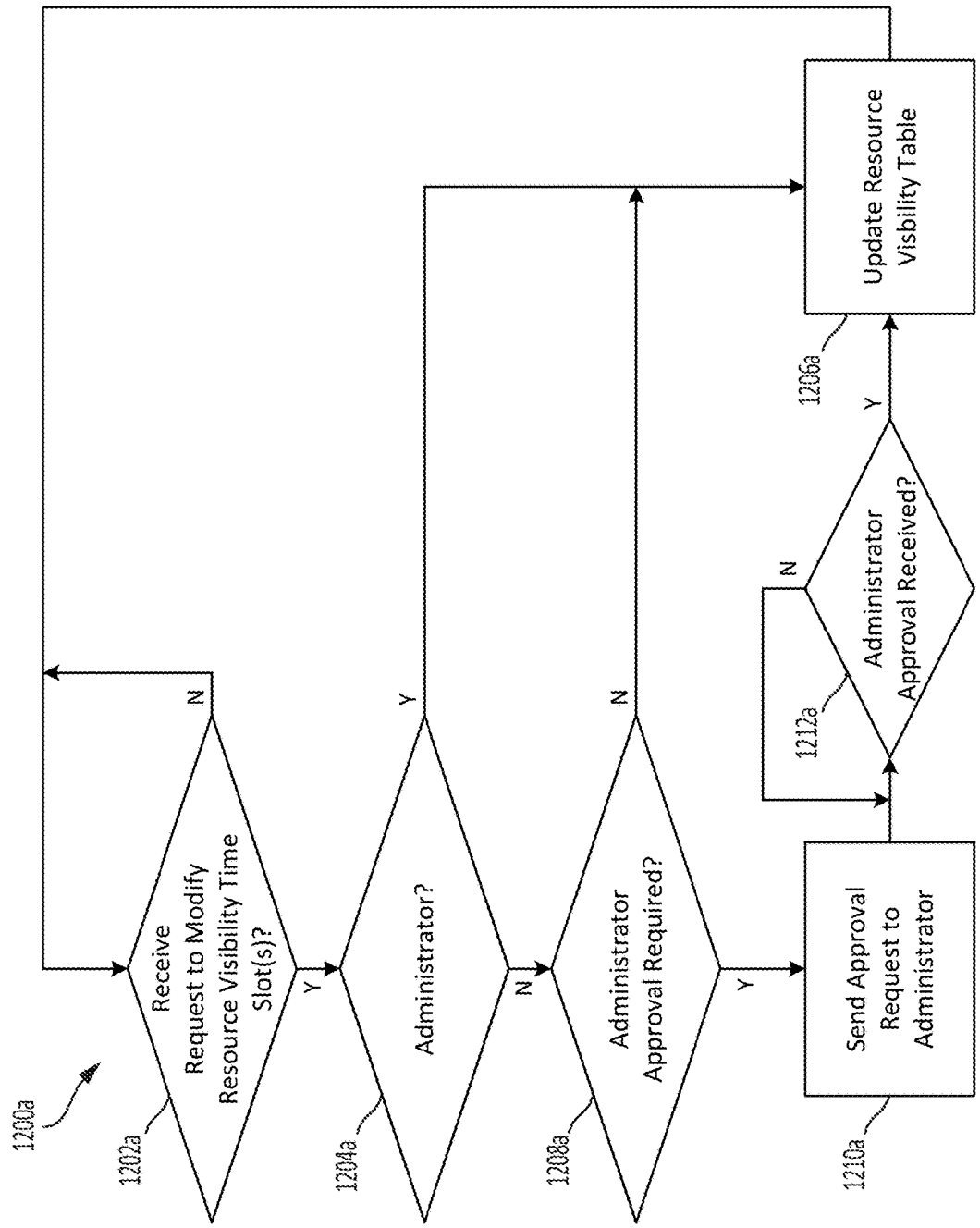
FIG. 12A shows an example routine that may be executed by the policy management engine shown in FIG. 5 to process a request to modify one or more accessibility time slots for a managed resource in accordance with some embodiments.

FIG. 12A shows an example routine 1200a that may be executed by the policy management engine 504 shown in FIG. 5 to process a request to modify one or more visibility time slots for a managed resource in accordance with some embodiments. As shown, at a step 1202a, a determination may be made as to whether a request has been received, from the client interface 502, to modify one or more visibility time slots for a particular computing resource. Such a request may, for example, correspond to a request sent by the client interface 502 in connection with the step 1104 of the routine 1100 (shown in FIG. 11). When a request to modify one or more visibility resources is received (at the step 1202a), the routine 1200a may proceed to a step 1204a, at which a determination may be made as to whether the request originated from a client device operated by a system administrator.

When, at the step 1204a, it is determined that the request originated from a system administrator, the routine 1200a may proceed to a step 1206a, at which the resource visibility table 108 (shown in FIG. 6) may be updated as requested.

When, at the step 1204a, it is determined that the request did not originate from a system administrator, the routine 1200a may proceed to a step 1208a, at which a determination may be made as to whether approval by a system administrator is required in order for the requested update to the resource visibility table 108 to be made. The determination whether administrator approval is required may, for example, be based on policy data governing privileges of particular users, particular client devices, and/or particular resources.

When, at the step 1208a, it is determined that system administrator approval is required, the routine 1200a may proceed a step 1210a, at which a request to approve the proposed modification to the resource visibility table 108 may be sent to a system administrator for approval. When, at a step 1212a, authorization for the proposed update is received from the system administrator, the routine may proceed to the step 1206a, at which the resource visibility table 108 may be updated as requested. When, at the step 1208a, it is determined that system administrator approval is not required, the routine 1200a may proceed directly to the step 1206a, at which the resource visibility table 108 may be updated as requested.

Figure 12B:
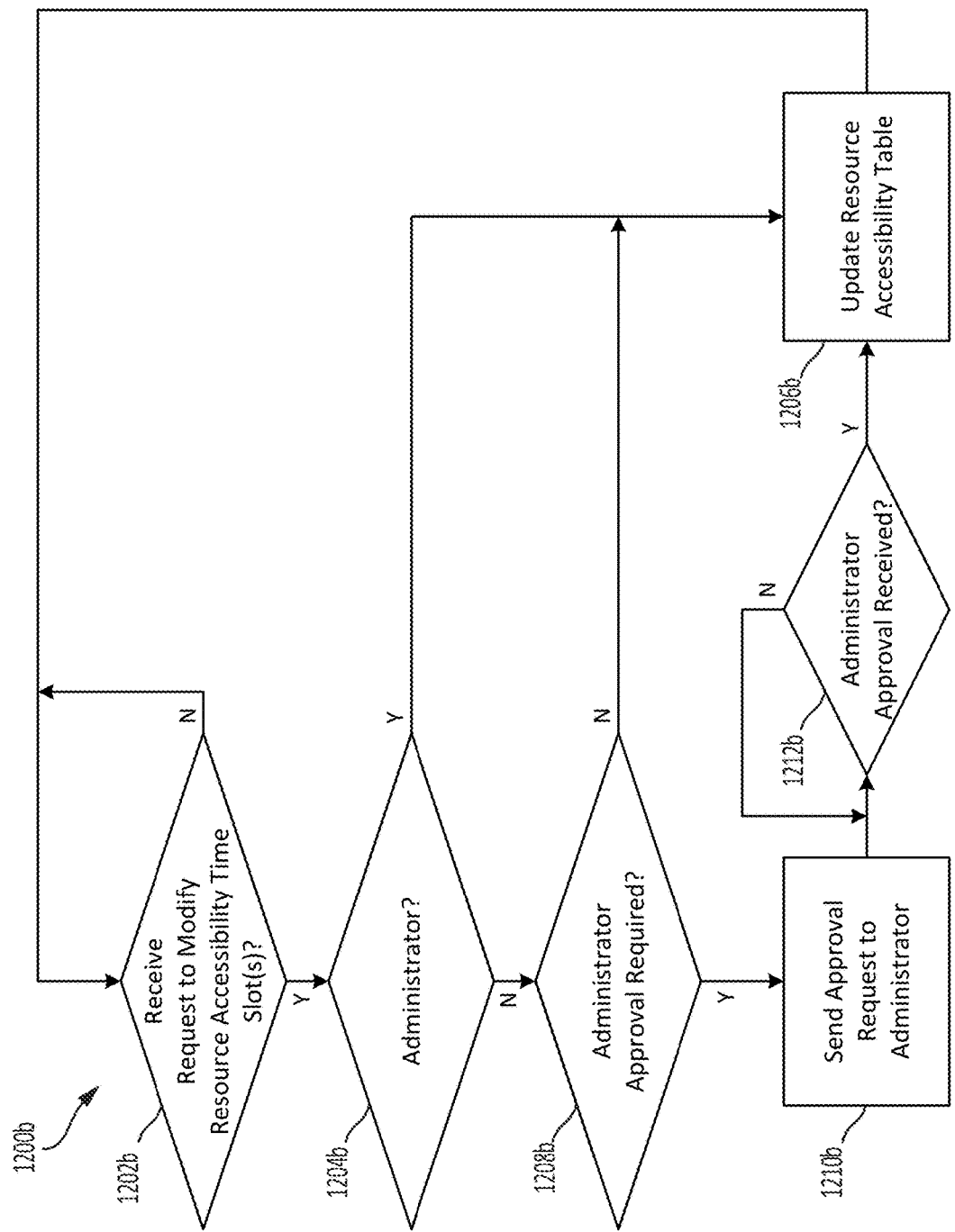
FIG. 12B shows an example routine that may be executed by the policy management engine shown in FIG. 5 to process a request to modify one or more visibility time slots for a managed resource in accordance with some embodiments.

FIG. 12B shows an example routine 1200b that may be executed by the policy management engine 504 shown in FIG. 5 to process a request to modify one or more accessibility time slots for a managed resource in accordance with some embodiments. As shown, at a step 1202b, a determination may be made as to whether a request has been received, from the client interface 502, to modify one or more accessibility time slots for a particular computing resource. Such a request may, for example, correspond to a request sent by the client interface 502 in connection with the step 1108 of the routine 1100 (shown in FIG. 11). When a request to modify one or more accessibility resources is received (at the step 1202b), the routine 1200b may proceed to a step 1204b, at which a determination may be made as to whether the request originated from a client device operated by a system administrator.

When, at the step 1204b, it is determined that the request originated from a system administrator, the routine 1200b may proceed to a step 1206b, at which the accessibility visibility table 602 (shown in FIG. 6) may be updated as requested.

When, at the step 1204b, it is determined that the request did not originate from a system administrator, the routine 1200b may proceed to a step 1208b, at which a determination may be made as to whether approval by a system administrator is required in order for the requested update to the resource accessibility table 602 to be made. The determination whether administrator approval is required may, for example, be based on policy data governing privileges of particular users, particular client devices, and/or particular resources.

When, at the step 1208b, it is determined that system administrator approval is required, the routine 1200b may proceed a step 1210b, at which a request to approve the proposed modification to the resource accessibility table 602 may be sent to a system administrator for approval. When, at a step 1212b, authorization for the proposed update is received from the system administrator, the routine may proceed to the step 1206b, at which the resource accessibility table 602 may be updated as requested. When, at the step 1208b, it is determined that system administrator approval is not required, the routine 1200b may proceed directly to the to the step 1206b, at which the resource accessibility table 602 may be updated as requested.

F. Example Implementations of Methods, Systems, and Computer-Readable Media in Accordance with the Present Disclosure The following paragraphs (M1) through (M9) describe examples of methods that may be implemented in accordance with the present disclosure.

(M1) A computer-implemented method may involve determining first data associating a first computing resource with at least one first time slot, determining that a current time is within the at least one first time slot, causing a first device to display a first indication that the first computing resource can be accessed using the first device based at least in part on the first data and the current time being within the at least one first time slot, determining that the current time is outside the at least one time slot, and causing the first device to cease displaying the first indication based at least in part on the first data and the current time being outside the at least one time slot.

(M2) A computer-implemented method may be performed as described in paragraph (M1), and may further involve determining that a first user is operating the first device, wherein the first data may further associate the first user with the first computing resource and the at least one time slot, and the first device may be caused to display the first indication further based at least in part on the first user operating the first device.

(M3) A computer-implemented method may be performed as described in paragraph (M1) or paragraph (M2), and may further involve determining, based at least in part on the first data, that the first computing resource is to be inaccessible by the first device outside of the at least one first time slot.

(M4) A computer-implemented method may be performed as described in paragraph (M3), and may further involve determining that a first user is operating the first device, wherein the first data may further associate the first user with the first computing resource and the at least one time slot, and determining that the first computing resource is to be inaccessible by the first device outside of the at least one first time slot may further be based in part on the first user operating the first device.

(M5) A computer-implemented method may be performed as described in any of paragraphs (M1) through (M4), and may further involve receiving, at a first time, a first request from the first device to identify resources can be accessed by the first device at the first time, determining that the first time is within the at least one first time slot, causing the first device to display the first indication based at least in part on the first data and the first time being within the at least one first time slot, receiving, at a second time, a second request from the first device to identify resources that can be accessed by the first device at the second time, determining that the second time is outside of the at least one first time slot, and causing the first device to display a second indication that the first computing resource is currently inaccessible by the first device based at least in part on the first data and the second time being outside of the at least one first time slot.

(M6) A computer-implemented method may be performed as described in any of paragraphs (M1) through (M5), and may further involve receiving, at a first time within the at least one first time slot, a first request from the first device to identify resources that have been scheduled for potential use at the first time; determining that the first time is within the at least one first time slot; causing the first device to display the first indication in response to the first request and based at least in part on the first data and the first time being within the at least one first time slot.

(M7) A computer-implemented method may be performed as described in paragraph (M6), and may further involve receiving, at a second time within the at least one time slot, a second request from the first device to identify resources that can be accessed by the first device at the second time; and in response to the second request, causing the first device to display the first indication.

(M8) A computer-implemented method may be performed as described in any of paragraphs (M1) through (M7), and may be performed by a computing system that communicates with the first device over a network.

(M9) A computer-implemented method may be performed as described in any of paragraphs (M1) through (M8), and may further involve receiving, from the first device, a request for access to the first computing resource; and causing the first computing resource to be delivered to the first device in response to the request for access.

The following paragraphs (S1) through (S9) describe examples of systems that may be implemented in accordance with the present disclosure.

(S1) A computing system may comprise at least one processor and at least one computer-readable medium. The at least one computer-readable medium may be encoded with instructions which, when executed by the at least one processor, cause the computing system to determine first data associating a first computing resource with at least one first time slot, to determine that a current time is within the at least one first time slot, to cause a first device to display a first indication that the first computing resource can be accessed using the first device based at least in part on the first data and the current time being within the at least one first time slot, to determine that the current time is outside the at least one time slot, and to cause the first device to cease displaying the first indication based at least in part on the first data and the current time being outside the at least one time slot.

(S2) A computing system may be configured as described in paragraph (S1), wherein the first data may further associate a first user with the first computing resource and the at least one time slot, and the at least one computer-readable medium may further be encoded with additional instructions which, when executed by the at least one processor, further cause the computing system to determine that the first user is operating the first device, and to cause the first device to display the first indication based at least in part on the first user operating the first device.

(S3) A computing system may be configured as described in paragraph (S1) or paragraph (S2), and the at least one computer-readable medium may further be encoded with additional instructions which, when executed by the at least one processor, further cause the computing system to determine, based at least in part on the first data, that the first computing resource is to be inaccessible by the first device outside of the at least one first time slot.

(S4) A computing system may be configured as described in paragraph (S3), wherein the first data may further associate a first user with the first computing resource and the at least one time slot, and the at least one computer-readable medium may be encoded with additional instructions which, when executed by the at least one processor, further cause the computing system to determine that the first computing resource is to be inaccessible by the first device outside of the at least one first time slot based in part on the first user operating the first device.

(S5) A computing system may be configured as described in any of paragraphs (S1) through (S4), and the at least one computer-readable medium may further be encoded with additional instructions which, when executed by the at least one processor, further cause the computing system to receive, at a first time, a first request from the first device to identify resources can be accessed by the first device at the first time, to determine that the first time is within the at least one first time slot, to cause the first device to display the first indication based at least in part on the first data and the first time being within the at least one first time slot, to receive, at a second time, a second request from the first device to identify resources that can be accessed by the first device at the second time, to determine that the second time is outside of the at least one first time slot, and to cause the first device to display a second indication that the first computing resource is currently inaccessible by the first device based at least in part on the first data and the second time being outside of the at least one first time slot.

(S6) A computing system may be configured as described in any of paragraphs (S1) through (S5), and the at least one computer-readable medium may further be encoded with additional instructions which, when executed by the at least one processor, further cause the computing system to receive, at a first time within the at least one first time slot, a first request from the first device to identify resources that have been scheduled for potential use at the first time, to determine that the first time is within the at least one first time slot, and to cause the first device to display the first indication in response to the first request and based at least in part on the first data and the first time being within the at least one first time slot.

(S7) A computing system may be configured as described in paragraph (S6), and the at least one computer-readable medium may further be encoded with additional instructions which, when executed by the at least one processor, further cause the computing system to receive, at a second time within the at least one time slot, a second request from the first device to identify resources that can be accessed by the first device at the second time, and to cause the first device to display the first indication in response to the second request.

(S8) A computing system may be configured as described in any of paragraphs (S1) through (S7), and may further be configured to communicate with the first device over a network.

(S9) A computing system may be configured as described in any of paragraphs (S1) through (S8), and the at least one computer-readable medium may further be encoded with additional instructions which, when executed by the at least one processor, further cause the computing system to receive, from the first device, a request for access to the first computing resource, and to cause the first computing resource to be delivered to the first device in response to the request for access.

The following paragraphs (CRM1) through (CRM8) describe examples of computer-readable media that may be implemented in accordance with the present disclosure.

(CRM1) At least one non-transitory, computer-readable medium may be encoded with instructions which, when executed by at least one processor, cause the at least one processor to determine first data associating a first computing resource with at least one first time slot, to determine that a current time is within the at least one first time slot, to cause a first device to display a first indication that the first computing resource can be accessed using the first device based at least in part on the first data and the current time being within the at least one first time slot, to determine that the current time is outside the at least one time slot, and to cause the first device to cease displaying the first indication based at least in part on the first data and the current time being outside the at least one time slot.

(CRM2) At least one computer-readable medium may be configured as described in (CRM1), wherein the first data may further associate a first user with the first computing resource and the at least one time slot, and the at least one computer-readable medium may further be encoded with additional instructions which, when executed by the at least one processor, further cause the at least one processor to determine that the first user is operating the first device, and to cause the first device to display the first indication based at least in part on the first user operating the first device.

(CRM3) At least one computer-readable medium may be configured as described in paragraph (CRM1) or paragraph (CRM2), and may further be encoded with additional instructions which, when executed by the at least one processor, further cause at least one processor to determine, based at least in part on the first data, that the first computing resource is to be inaccessible by the first device outside of the at least one first time slot.

(CRM4) At least one computer-readable medium may be configured as described in paragraph (CRM3), wherein the first data may further associate a first user with the first computing resource and the at least one time slot, and the at least one computer-readable medium may be encoded with additional instructions which, when executed by the at least one processor, further cause the at least one processor to determine that the first computing resource is to be inaccessible by the first device outside of the at least one first time slot based in part on the first user operating the first device.

(CRM5) At least one computer-readable medium may be configured as described in any of paragraphs (CRM1) through (CRM4), and may further be encoded with additional instructions which, when executed by the at least one processor, further cause the at least one processor to receive, at a first time, a first request from the first device to identify resources can be accessed by the first device at the first time, to determine that the first time is within the at least one first time slot, to cause the first device to display the first indication based at least in part on the first data and the first time being within the at least one first time slot, to receive, at a second time, a second request from the first device to identify resources that can be accessed by the first device at the second time, to determine that the second time is outside of the at least one first time slot, and to cause the first device to display a second indication that the first computing resource is currently inaccessible by the first device based at least in part on the first data and the second time being outside of the at least one first time slot.

(CRM6) At least one computer-readable medium may be configured as described in any of paragraphs (CRM1) through (CRM5), and may further be encoded with additional instructions which, when executed by the at least one processor, further cause the at least one processor to receive, at a first time within the at least one first time slot, a first request from the first device to identify resources that have been scheduled for potential use at the first time, to determine that the first time is within the at least one first time slot, and to cause the first device to display the first indication in response to the first request and based at least in part on the first data and the first time being within the at least one first time slot.

(CRM7) At least one computer-readable medium may be configured as described in paragraph (CRM6), and may further be encoded with additional instructions which, when executed by the at least one processor, further cause the at least one processor to receive, at a second time within the at least one time slot, a second request from the first device to identify resources that can be accessed by the first device at the second time, and to cause the first device to display the first indication in response to the second request.

(CRM8) At least one computer-readable medium may be configured as described in any of paragraphs (CRM1) through (CRM7), and may further be encoded with additional instructions which, when executed by the at least one processor, further cause the at least one processor to receive, from the first device, a request for access to the first computing resource, and to cause the first computing resource to be delivered to the first device in response to the request for access.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-implemented method, comprising:
    determining first data, stored in at least one storage medium, that associates a first computing resource with at least one time slot;
    determining that a current time is within the at least one time slot;
    based at least in part on the first data and the current time being within the at least one time slot, causing a first device to display a first indication that the first computing resource can be accessed using the first device;
    determining that the current time is outside the at least one time slot; and
    based at least in part on the first data and the current time being outside the at least one time slot, causing the first device to cease displaying the first indication.

2. The computer-implemented method of claim 1, further comprising determining that a first user is operating the first device, wherein:
    the first data further associates the first user with the first computing resource and the at least one time slot, and
    causing the first device to display the first indication is further based at least in part on the first user operating the first device.

3. The computer-implemented method of claim 1, further comprising:
    determining, based at least in part on the first data, that the first computing resource is to be inaccessible by the first device outside of the at least one time slot.

4. The computer-implemented method of claim 3, further comprising determining that a first user is operating the first device, wherein:
    the first data further associates a first user with the first computing resource and the at least one time slot, and
    determining that the first computing resource is to be inaccessible by the first device outside of the at least one time slot is further based in part on the first user operating the first device.

5. The computer-implemented method of claim 1, further comprising:
    receiving, at a first time, a first request from the first device to identify resources can be accessed by the first device at the first time;
    determining that the first time is within the at least one time slot;
    based at least in part on the first data and the first time being within the at least one time slot, causing the first device to display the first indication;
    receiving, at a second time, a second request from the first device to identify resources that can be accessed by the first device at the second time;
    determining that the second time is outside of the at least one time slot; and
    based at least in part on the first data and the second time being outside of the at least one time slot, causing the first device to display a second indication that the first computing resource is currently inaccessible by the first device.

6. The computer-implemented method of claim 1, further comprising:
    receiving, at a first time within the at least one time slot, a first request from the first device to identify resources that have been scheduled for potential use at the first time;
    determining that the first time is within the at least one time slot; and
    in response to the first request and based at least in part on the first data and the first time being within the at least one time slot, causing the first device to display the first indication.

7. The computer-implemented method of claim 6, further comprising:
    receiving, at a second time within the at least one time slot, a second request from the first device to identify resources that can be accessed by the first device at the second time; and
    in response to the second request, causing the first device to display the first indication.

8. The computer-implemented method of claim 1, wherein the method is performed by a computing system that communicates with the first device over a network.

9. The computer-implemented method of claim 8, further comprising:
    receiving, from the first device, a request for access to the first computing resource; and
    causing the first computing resource to be delivered to the first device in response to the request for access.

10. A computing system, comprising:
    at least one processor;
    at least one storage medium; and
    at least one computer-readable medium encoded with instructions which, when executed by the at least one processor, cause the computing system to:
        determine first data, stored in the at least one storage medium, that associates a first computing resource with at least one time slot;

determine that a current time is within the at least one time slot;

based at least in part on the first data and the current time being within the at least one time slot, cause a first device to display a first indication that the first computing resource can be accessed using the first device;

determine that the current time is outside the at least one time slot; and based at least in part on the first data and the current time being outside the at least one time slot, cause the first device to cease displaying the first indication.

11. The computing system of claim 10, wherein the first data further associates a first user with the first computing resource and the at least one time slot, and the at least one computer-readable medium is encoded with additional instructions which, when executed by the at least one processor, further cause the computing system to:

determine that the first user is operating the first device; and cause the first device to display the first indication based at least in part on the first user operating the first device.

12. The computing system of claim 10, wherein the at least one computer-readable medium is encoded with additional instructions which, when executed by the at least one processor, further cause the computing system to:

determine, based at least in part on the first data, that the first computing resource is to be inaccessible by the first device outside of the at least one time slot.

13. The computing system of claim 12, wherein:

the first data further associates a first user with the first computing resource and the at least one time slot; and the at least one computer-readable medium is encoded with additional instructions which, when executed by the at least one processor, further cause the computing system to determine that the first computing resource is to be inaccessible by the first device outside of the at least one time slot based in part on the first user operating the first device.

14. The computing system of claim 10, wherein the at least one computer-readable medium is encoded with additional instructions which, when executed by the at least one processor, further cause the computing system to:

receive, at a first time, a first request from the first device to identify resources can be accessed by the first device at the first time;

determine that the first time is within the at least one time slot;

based at least in part on the first data and the first time being within the at least one time slot, cause the first device to display the first indication;

receive, at a second time, a second request from the first device to identify resources that can be accessed by the first device at the second time;

determine that the second time is outside of the at least one time slot; and based at least in part on the first data and the second time being outside of the at least one time slot, cause the first device to display a second indication that the first computing resource is currently inaccessible by the first device.

15. The computing system of claim 10, wherein the at least one computer-readable medium is encoded with additional instructions which, when executed by the at least one processor, further cause the computing system to:

receive, at a first time within the at least one time slot, a first request from the first device to identify resources that have been scheduled for potential use at the first time;

determine that the first time is within the at least one time slot; and in response to the first request and based at least in part on the first data and the first time being within the at least one time slot, cause the first device to display the first indication.

16. The computing system of claim 15, wherein the at least one computer-readable medium is encoded with additional instructions which, when executed by the at least one processor, further cause the computing system to:

receive, at a second time within the at least one time slot, a second request from the first device to identify resources that can be accessed by the first device at the second time; and in response to the second request, cause the first device to display the first indication.

17. The computing system of claim 10, wherein the computing system is configured to communicate with the first device over a network.

18. The computing system of claim 17, wherein the at least one computer-readable medium is encoded with additional instructions which, when executed by the at least one processor, further cause the computing system to:

receive, from the first device, a request for access to the first computing resource; and cause the first computing resource to be delivered to the first device in response to the request for access.

19. At least one non-transitory computer-readable medium encoded with instructions which, when executed by at least one processor of a computing system, cause the computing system to:

determine first data, stored in at least one storage medium, that associates a first computing resource with at least one time slot;

determine that a current time is within the at least one time slot;

based at least in part on the first data and the current time being within the at least one time slot, cause a first device to display a first indication that the first computing resource can be accessed using the first device;

determine that the current time is outside the at least one time slot; and based at least in part on the first data and the current time being outside the at least one time slot, cause the first device to cease displaying the first indication.

20. The at least one non-transitory computer-readable medium of claim 19, wherein the first data further associates a first user with the first computing resource and the at least one time slot, and the at least one non-transitory computer-readable medium is encoded with additional instructions which, when executed by the at least one processor, further cause the computing system to:

determine that the first user is operating the first device; and cause the first device to display the first indication based at least in part on the first user operating the first device.

* * * * *